United States Patent
Donoho et al.

(10) Patent No.: US 7,693,810 B2
(45) Date of Patent: Apr. 6, 2010

(54) METHOD AND SYSTEM FOR ADVANCED SCENARIO BASED ALERT GENERATION AND PROCESSING

(75) Inventors: Steven Kirk Donoho, Chantilly, VA (US); Tomasz Grzegorz Dybala, Fairfax, VA (US); James Joseph Hayden, Vienna, VA (US); Linda Hagen Grote, Fairfax Station, VA (US); William Edgar Brooks, Jr., Hartwood, VA (US)

(73) Assignee: Mantas, Inc., Herndon, VA (US)

( * ) Notice: Subject to any disclaimer, the term of this patent is extended or adjusted under 35 U.S.C. 154(b) by 575 days.

(21) Appl. No.: 10/379,425

(22) Filed: Mar. 4, 2003

(65) Prior Publication Data

US 2004/0177053 A1 Sep. 9, 2004

(51) Int. Cl.
*G06F 17/00* (2006.01)
*G06N 5/02* (2006.01)
*G06Q 40/00* (2006.01)

(52) U.S. Cl. .......................... 706/48; 706/925; 705/35

(58) Field of Classification Search ............... 706/12, 706/46–48, 925, 934, 10; 700/49; 707/6, 707/100, 104.1; 364/550; 705/35–36, 4, 705/38–39, 1; 455/410; 709/224; 726/22–23
See application file for complete search history.

(56) References Cited

U.S. PATENT DOCUMENTS

| | | | | |
|---|---|---|---|---|
| 5,832,482 A | * | 11/1998 | Yu et al. ........................ | 707/6 |
| 6,094,643 A | * | 7/2000 | Anderson et al. .............. | 705/44 |
| 6,330,546 B1 | * | 12/2001 | Gopinathan et al. ........... | 705/35 |
| 2002/0133721 A1 | * | 9/2002 | Adjaoute ...................... | 713/201 |
| 2003/0033228 A1 | * | 2/2003 | Bosworth-Davies et al. .. | 705/35 |
| 2003/0084053 A1 | | 5/2003 | Govrin et al. | |
| 2003/0182214 A1 | * | 9/2003 | Taylor .......................... | 705/35 |
| 2004/0098405 A1 | * | 5/2004 | Zrubek et al. ........... | 707/103 R |
| 2004/0103049 A1 | * | 5/2004 | Kerr ............................. | 705/35 |
| 2004/0138978 A1 | * | 7/2004 | Zhang et al. .................. | 705/36 |

(Continued)

OTHER PUBLICATIONS

Goldberg-H-G and Wong-R-W-H. "Restructuring transactional data for link analysis in the FinCEN AI system." pp. 38-46 of Proc. of AI and Link Analysis, Orlando, FL. Oct. 23-25, 1998.*

(Continued)

*Primary Examiner*—David R Vincent
*Assistant Examiner*—Benjamin Buss
(74) *Attorney, Agent, or Firm*—Pepper Hamilton LLP

(57) ABSTRACT

A computer based method and system generates alerts based on the detection of an advanced scenario in a data set. The system and method may take data related to events and entities, transform the data, and apply advanced scenarios to the data to produce matches that reflect the occurrence of an advanced scenario and the behavior of interest. The advanced scenarios can be defined to cover specific product lines and services, lines of businesses, and combinations thereof. The advanced scenarios can be defined to be indicative of a behavior class, or a specific behavior which is part of a behavior class. Alerts produced by the system can be grouped, prioritized and routed such that the appropriate users are notified in a timely manner. The system and method can be applied to a variety of industries including financial and health care, and can detect both illicit and licit behaviors of interest.

24 Claims, 21 Drawing Sheets

U.S. PATENT DOCUMENTS

2004/0230586 A1* 11/2004 Wolman .................. 707/100
2005/0043961 A1*  2/2005 Torres et al. .................. 705/1
2005/0075992 A1*  4/2005 Gavan et al. ................ 706/47

OTHER PUBLICATIONS

Goldberg-H-G and Senator-T-E. "Restructuring Databases for Knowledge Discovery by Cosolidation and Link Formation" Proc of Artificial Intelligence and Link Analysis, Oct. 1998.*

Senator,T.E. et al. "The Financial Crimes Enforcement Network AI System (FAIS): Identifying Potential Money Laundering from Reports of Large Case Transactions" American Association for Artificial Intelligence. Winter 1995.*

Goldberg,H.G. and Senator,T.E. "Restructuring Databases for Knowledge Discovering by Consolidation and Link Formation" AAAI Tech Report FS-98-01. AAAI 1998. (Reprinted from Proc. First Int'l Conf. on Knowledge Discovery & Data Mining (KDD95), AAAI Press, 1995.).*

Goldberg,H.G. and Wong,R.W.H. "Restructuring Transactional Data for Link Analysis in the FinCEN AI System" AAAI Tech Report FS-98-01. AAAI 1998.*

Fawcett,T. et al. "AI Approaches to Fraud Detection and Risk Management" AI Magazine vol. 19 No. 2. AAAI. 1998.*

Kirkland,J.D. et al. "The NASD Regulation Advanced-Detection System (ADS)" AI Magazine vol. 20. No. 1. AAAI. 1999.*

Senator,T.E. "Ongoing Management and Application of Discovered Knowledge in a Large Regulatory Organization: A Case Study of the Use and Impact of NASD Regulations Advanced Detection System (ADS)" KDD2000. ACM. 2000.*

Bolton,R.J. et al. "Unsupervised Profiling Methods for Fraud Detection" Conference on credit scoring and credit control, 2001.*

Mantas, Inc., The Mantas Advantage, http://www.mantas.com/website/solutions/solutions_advantage.html, Dec. 3, 2001.

Mantas, Inc., What is Knowledge Discovery?, http://www.mantas.com/website/solutions/solutions_whatis.html, Dec. 3, 2001.

Mantas, Inc., Products, http://www.mantas.com/website/solutions/solutions_products.html, Dec. 3, 2001.

Mantas, Inc., Mantas Best Execution, http://www.mantas.com/website/solutions/solutions_best_execut.html, Dec. 3, 2001.

Mantas, Inc., The Mantas Equities Trading Compliance, http://www.mantas.com/website/solutions/solutions_equ_trd_comp.html, Dec. 3, 2001.

Mantas, Inc., Fraud and Money Laundering Detection for Securities Firms, http://www.mantas.com/website/solutions/solutions_fraud_ml_sec_firms.html, Dec. 3, 2001.

Mantas, Inc., Fraud and Money Laundering Detection for Banks, http://www.mantas.com/website/solutions/solutions_fraud_ml_banks.html, Dec. 3, 2001.

Affidavit of Steven Kirk Donoho, Nov. 14, 2003.

* cited by examiner

700 — Example #1: Find AAA in the following stream of events — 712
ABCBACBCAAABCBACBBCCBAAAABBC — 716

704 — Example #2: AB*A means "Find an A followed by zero or more B's followed by an A" — 732
CADAACDBADADABABBBBACDABDCABDB — 736

708 — Example #3: A(BC)+ means "Find an A followed by one or more BC pairs" — 752
DCBCABCDCABCBCBCBCBBD — 756

Focus: CB Manufactures Merchant Bank  
Scenario: MI - Sequential No  
Class: OMB  
Highlights: USD 25,200, #Items, 36, #Pouches, 1; #Accts, 1

Owner: WA044207  
Org: CLR

Score: 99  
Prior: 3  
Created: 10/08/2001

Status: OPEN  
(Help)

| Client Bank ID | Name | Type | Bus Unit | Watchlist | Location |
|---|---|---|---|---|---|
| 036986035 | Manufacturers Merchant Bank | FI CITI | -- | | 15 Trinidad Terrace, Kingston 5, JM |

Cash Products, Check Transactions

| Post Date | Group ID | Src | Type | Serial/Check # | Amount | Remitter Name | Remitter Acct No | Remitter Name | Remitter Acct No | 3P/PT | Frgn Chk |
|---|---|---|---|---|---|---|---|---|---|---|---|
| 10/05/2001 | 066121234567 | CLR | PMO | 0161781053 | USD 700 | Antoinette Fuller | -- | Samuel Birch | 36176008 | N | N |
| 10/05/2001 | 066121234567 | CLR | PMO | 0161781054 | USD 700 | Antoinette Fuller | -- | Samuel Birch | 36176008 | N | N |
| 10/05/2001 | 066121234567 | CLR | PMO | 0161781055 | USD 700 | Nicola Reid | -- | Samuel Birch | 36176008 | N | N |
| 10/05/2001 | 066121234567 | CLR | PMO | 0161781056 | USD 700 | Sophia Shepard | -- | Samuel Birch | 36176008 | N | N |
| 10/05/2001 | 066121234567 | CLR | PMO | 0218171820 | USD 700 | Vernia Sewell | -- | Samuel Birch | 36176008 | N | N |
| 10/05/2001 | 066121234567 | CLR | PMO | 0218171821 | USD 700 | Sophia Shepard | -- | Samuel Birch | 36176008 | N | N |
| 10/05/2001 | 066121234567 | CLR | PMO | 0218171822 | USD 700 | Sophia Shepard | -- | Samuel Birch | 36176008 | N | N |
| 10/05/2001 | 066121234567 | CLR | PMO | 0218171823 | USD 700 | Antoinette Fuller | -- | Samuel Birch | 36176008 | N | N |
| 10/05/2001 | 066121234567 | CLR | PMO | 0218200136 | USD 700 | Nicola Reid | -- | Samuel Birch | 36176008 | N | N |
| 10/05/2001 | 066121234567 | CLR | PMO | 0218200137 | USD 700 | Nicola Reid | -- | Samuel Birch | 36176008 | N | N |
| 10/05/2001 | 066121234567 | CLR | PMO | 0218200138 | USD 700 | Erica Robinson | -- | Samuel Birch | 36176008 | N | N |
| 10/05/2001 | 066121234567 | CLR | PMO | 0218200139 | USD 700 | John Washington | -- | Samuel Birch | 36176008 | N | N |
| 10/05/2001 | 066121234567 | CLR | PMO | 8528804606 | USD 700 | John Washington | -- | Samuel Birch | 36176008 | N | N |
| 10/05/2001 | 066121234567 | CLR | PMO | 8528804607 | USD 700 | John Washington | -- | Samuel Birch | 36176008 | N | N |

FIG. 17

Transactions

| Date | Type | Amount | Number | Remitter | Remitter Address |
|---|---|---|---|---|---|
| 07/31/00 | Monetary Instruments | $100,000 | 100 | Helen | |

2 of 2 Displayed    HELP>>

Alert History

| Date | Action | By | Alert ID | Scenario | Scenario |
|---|---|---|---|---|---|
| 03/31/00 | Closed - case opened | L. Martinez | 3018 | Hidden Relationship | Recurring Remitter; MI 101, $101,000 |
| 01/31/00 | Closed | M. Murphy | 2867 | Hidden Relationship | Recurring Remitter; MI 200, $200,000 |

HELP>>

Previous SARS Filed

| Date Filed | SAR Database Reference Number | Compliance Manager | Law Enforcement Notified | Agency Notified |
|---|---|---|---|---|
| 04/24/00 | SAR 4356 | M. Humphry | No | |

Overview   Alerts   Query   Reports   Preferences   Logout

FIG. 18

Select an Organization or User and a Scenario Class or specific Scenario for the report.

Filter by:
- Organization: [    ▶]   or Owner: [All ▶]
- Scenario Class: [All ▶]   or Scenario: [    ▶]
- Age >=: [0]

[Help]  [Do it]

Workload Management Report

Report Date: 04/20/01
Report Time: 14:32

Subject: All

[Print Preview]  [Help]

| | Total | <=5d | <=10d | <=20d | >=20d |
|---|---|---|---|---|---|
| | 474 | 456 | 17 | 9 | 0 |

Scenario Class: All    Alerts 0 Days and older

| Organization | Owner | New Alerts | | Open Alerts | | Reopened Alerts | |
|---|---|---|---|---|---|---|---|
| | | Alerts | Avg Time | Alerts | Avg Time | Alerts | Avg Time |
| IA Pool | user 1 | 100 | 1d, 2h | 120 | 8d, 4h | 8 | 4d, 20h |
| | user 2 | 0 | 0d, 0h | 40 | 6d, 3h | 6 | 4d, 2h |
| | user 3 | 0 | 0d, 0h | 60 | 16d, 6h | 0 | 0d, 0h |
| | IA Pool | 0 | 0d, 0h | 20 | 4d, 2h | 2 | 5d, 12h |
| | | 100 | 1d, 2h | 0 | 0d, 0h | 0 | 0d, 0h |
| | | | | 140 | 10d, 6h | 11 | 6d, 3h |
| Fraud | user 4 | 0 | 0d, 0h | 100 | 8d, 20h | 5 | 5d, 22h |
| | user 5 | 0 | 0d, 0h | 40 | 14d, 3h | 6 | 6d, 12h |
| | | | | 90 | 7d, 2h | 5 | 4d, 7h |
| Money Laundering | user 6 | 0 | 0d, 0h | 50 | 7d, 7h | 4 | 5d, 6h |
| | user 7 | 0 | 0d, 0h | 10 | 5d, 0h | 0 | 0d, 0h |
| | user 8 | 0 | 0d, 0h | 30 | 6d, 12h | 1 | 8d, 3h |
| Total | | 100 | 1d, 2h | 350 | 8d, 17h | 24 | 5d, 17h |

FIG. 19

METHOD AND SYSTEM FOR ADVANCED SCENARIO BASED ALERT GENERATION AND PROCESSING

FIELD OF THE INVENTION

The present invention relates generally to computer-implemented behavior detection methods and systems. More particularly, the present invention relates to behavior detection methods and systems that determine whether data that is representative of behavior fits a pre-determined advanced scenario.

BACKGROUND OF THE INVENTION

The invention of the computer and the development of the Internet has ushered in an era frequently referred to as the "Information Age" in which information is traded as a commodity and used in ways previously unimaginable. The low cost for storage and transmission of data means that all of the details of numerous daily transactions can be recorded and subsequently analyzed. These transactions are not limited to financial transactions—although those records are extremely revealing and may in some sense be the most important records—but can also include other aspects of personal and corporate life including communications, transportation and health.

The value of information is increasing as new ways to utilize that asset are developed. In many instances, a company's ability to effectively manage its data assets can determine the company's long-term viability. Companies that are inefficient in managing their acquired data assets find themselves at a competitive disadvantage with respect to other firms that have developed the expertise to fully exploit their information. As an example, retail stores that have been able to effectively mine and utilize their data to better understand and predict customer behavior have consistently been able to seize market share from their less agile competitors.

Mining of data can involve looking for a specific event, typically defined by single parameter or a small number of parameters related to a specific condition. As an example, a set of consumer data can be searched for credit transactions exceeding a threshold, or for an aggregate amount of transactions in a specified period of time exceeding a given threshold. Reporting these sets of transactions provides a simple means of identifying behaviors of interest. In the present example, it becomes possible to identify potential credit risks: individuals or corporations that have made single large transactions or sets of transactions in a specified time period that are substantially larger than 'normal' can be flagged as potential credit risks.

Nevertheless, in the prior art, tabulating occurrences indicative of a possible credit risk will not only produce a large number of false positives but can also potentially identify a large number of transactions and customers, with no indication as to how these transactions and customers are related to other events and entities that are indicative of the behavior of interest. Although the algorithms that can be applied to a dataset can be sophisticated and powerful and thus work to reduce the number of false positives, the behavior of interest typically has a complex definition and could not previously be identified by a computer.

We have found that it is desirable to have a system that allows the user to define an advanced scenario involving a number of aspects of the behavior of interest as applied to different lines of business and products, and to apply that definition of the advanced scenario to a dataset, producing alerts. The alerts should be presented to the user in a format that allows further investigation of different aspects of the behavior and filtering such that rapid pinpointing of individuals or corporations fitting the behavior of interest is possible.

For the foregoing reasons, there is a need for a method and a system that allows a user to define a behavior of interest, specifically describe aspects of that behavior related to both events and entities that are associated with that behavior, and subsequently monitor, on an ongoing basis, for the combinations of events and entities that are indicative of the behavior of interest.

SUMMARY OF THE INVENTION

An embodiment of the present invention provides an advanced scenario based alert generation and processing system that allow large amounts of data to be analyzed in an automated process using a plurality of detection algorithms that, when applied to the data, produce alerts that are indicative of sets of events and entities of interest. By allowing the user to specifically define the advanced scenario of interest, it becomes possible to use multiple parameters tied to seemingly unrelated aspects of events and entities, temporally and spatially, as the basis for the behavior detection. Application of the advanced scenario to the data allows, through detection processing and the matching of the parameters of the advanced scenario to instantiations of the defined characteristics of events and entities in the data, for the generation of alerts based on the number and types of matches identified. The detection processing can also include the detection of relationships among events and entities in a portion of the dataset.

In one embodiment, the matches can be prioritized based on user defined logic such that a set of prioritized matches is developed, indicating to the user which matches are more likely to be indicative of the behavior of interest. The matches can also be grouped according to a focus, the focus being a business application, particular line of products or services, a specific set of illicit or licit activities. User defined logic, in which matches can be grouped or associated according to rules relating to various aspects of the matches, can also be used to prioritize the matches. The groups of matches themselves can then be prioritized based on user defined logic and values.

The matches, prioritized matches, groups of matches, and prioritized groups of matches can be used to generate alerts. These alerts can be displayed to the user and routed to a defined set of recipients.

One embodiment also encompasses a computer based method for generating alerts to a specific behavior as represented in the data. One method includes the steps of receiving the data and transforming into a format compatible with the behavior detection process, storing the data to create a dataset for mining and periodically updating that dataset with new data, retrieving a behavior description, with the behavior description containing a plurality of conditions related to events and entities, those events and entities being indicative of the specific behavior, retrieving a portion of the dataset and performing detection processing to generate a plurality of alerts, with the alerts being indicative of the specific behavior.

The detection processing can be based on algorithms including link analysis, sequence matching, rule based analysis, and outlier detection. A combination of algorithms, based both on events and entities, can be used to perform the detection processing.

The alerts can be processed and filtered based on user defined filter parameters including but not limited to organization, owner, scenario class, scenario, prioritization, focus, age, and status.

The detection of complex behaviors requires a complex representation space that is not supported by the majority of pattern discovery algorithms or similar tools. The method, system, and software presented has the advantage that it allows data to be mined in new ways, allowing for the automated identification of complex behaviors as defined by advanced scenarios. The ability to manage and process alerts allows the user to pinpoint specific activities that have been aggregated in meaningful ways.

These and other features and objects of the invention will be more fully understood from the following detailed description of the embodiments which should be read in light of the accompanying drawings.

In this respect, before explaining at least one embodiment of the invention in detail, it is to be understood that the invention is not limited in its application to the details of construction and to the arrangements of the components set forth in the description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be used as a basis for designing other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The accompanying drawings, which are incorporated in and form a part of the specification, illustrate embodiments of the present invention and, together with the description serve to explain the principles of the invention.

FIG. 7 is a representation of sequence matching;

FIG. 16 illustrates a graphical user interface for alert display, alert filtering and alert viewing;

FIG. 17 illustrates the upper half of a graphical user interface for viewing of alert details;

FIG. 18 illustrates the lower half of a graphical user interface for viewing of alert detail;

FIG. 19 illustrates a graphical user interface for workload management; and

DETAILED DESCRIPTION OF PREFERRED EMBODIMENTS OF THE INVENTION

Figure 1:
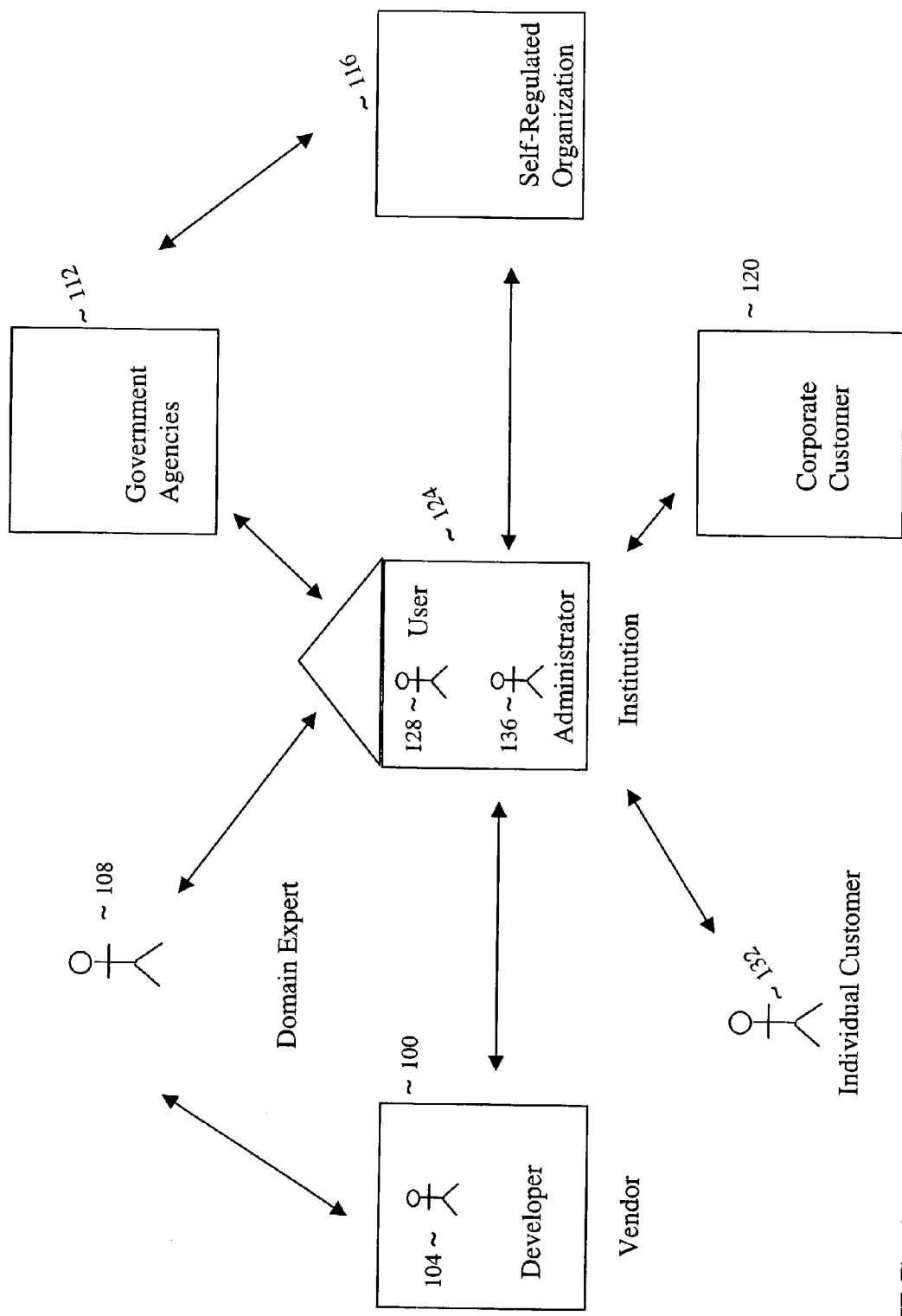
FIG. 1 illustrates a user-relationship diagram of the advanced scenario based alert generation and processing system.

In describing an embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose FIG. 1 illustrates a user-relationship diagram for an embodiment of the advanced scenario based alert generation and processing system. As can be seen in FIG. 1, a vendor 100 with a developer 104 can work directly with a domain expert 108, institution 124, administrator 136 and/or user 128 in developing, creating, and implementing information based products and services. Domain expert 108 has, generally speaking, specialized knowledge about the application and can act as a subject matter expert. Administrator 136 and user 128 can monitor both individual customer 132 as well as a corporate customer 120. A self-regulated organization 116 develops rules and regulations that its members (e.g. institution 124) adhere to, either for preservation of the industry or to comply with government regulations.

As an example, institution 124 may be a US securities brokerage that services individuals as well as corporations. The Securities and Exchange Commission (SEC) requires that institution 124 perform self-monitoring, which it does by performing that monitoring according to the standards set by National Association of Securities Dealers (NASD) a self-regulated organization 116.

Institution 124 or self regulated organization 116 may be subject to regulation by a variety of government agencies 112, examples of which are the Internal Revenue Service (IRS), Federal Bureau of Investigation (FBI), US Treasury, Securities and Exchange Commission (SEC), and Immigration and Naturalization Services (INS). Institution 124 may be subject to and/or a member of self-regulating organization 116 such as professional or financial associations that provide operating guidelines for their members with the goal of being self-regulating as opposed to government regulated.

Understanding behaviors may be important to institution 124 for purposes of better understanding or protecting their customer, or for reporting certain behaviors to government agencies. Self-regulated organization 116 may also require its member institutions to perform a specific level and/or type of behavior monitoring in order to ensure that all members are compliant with the organization's rules.

Figure 2:
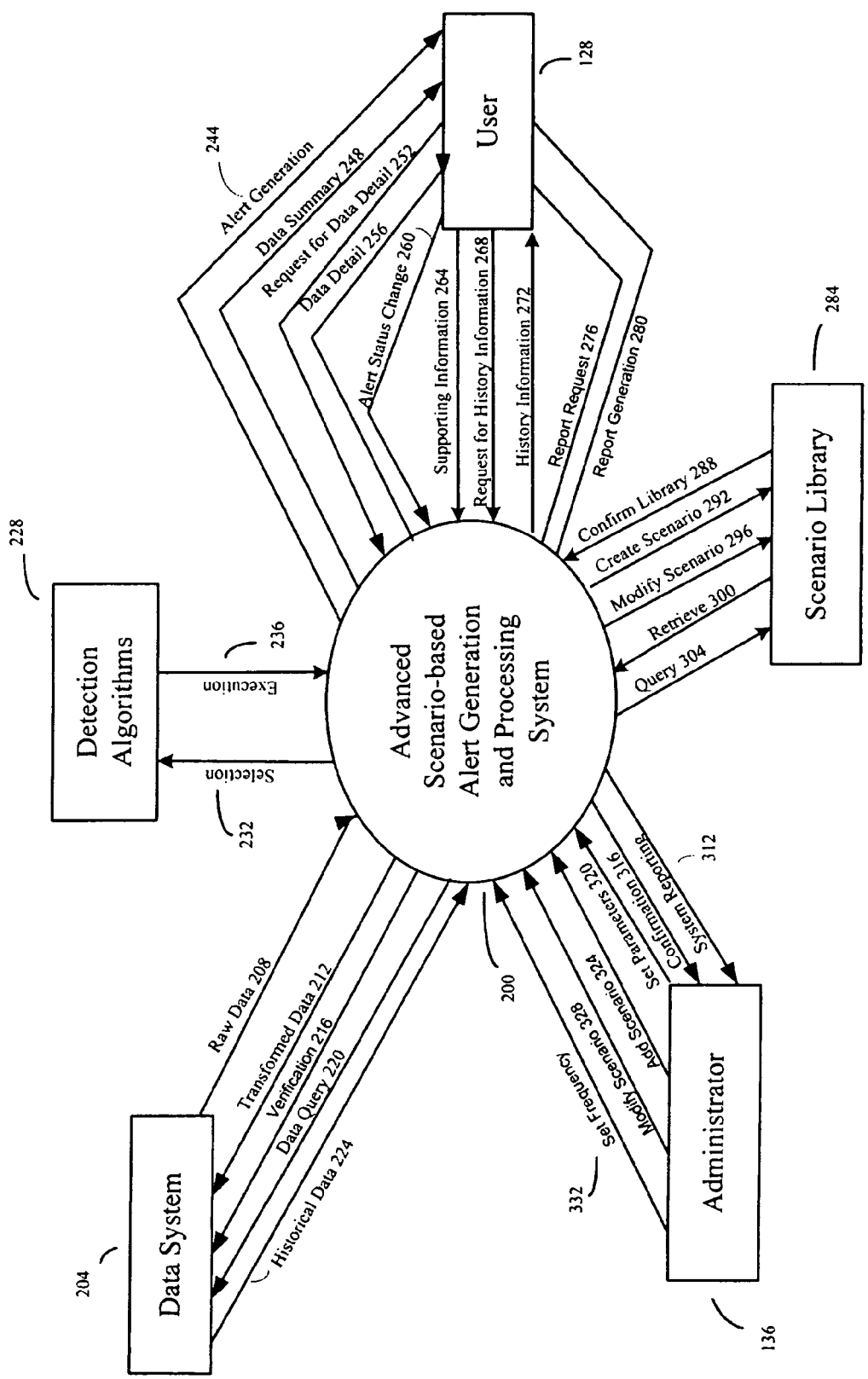
FIG. 2 represents a context diagram.

FIG. 2 illustrates a context-diagram for the advanced scenario-based alert generation and processing system 200. The main elements of this environment include, but are not limited to, data system 204, detection algorithms 228, user 128, scenario library 284, and administrator 136.

In interfacing with the advanced scenario-based alert generation and processing system 200, the administrator 136 may set frequency 332 which determines the time and frequency that the advanced scenario-based alert generation and processing system 200 performs its advanced capabilities. Furthermore, the administrator 136 may modify scenario 328 that accesses an existing scenario from the scenario library 284 in order to make and save desired changes. Additional scenarios may be added by the administrator 136 through an add scenario 324 capability thereby allowing for continuous upgrading and enhancing of the advanced scenario-based alert generation and processing system 200. The administrator 136 may also set parameter 320 enabling greater flexibility and capability in detecting desired behaviors, transactions, or relationships across entities and events. The advanced scenario-based alert generation and processing system 200 is capable of sending confirmation 316 of set frequency 332, modify scenario 328, add scenario 324, and set parameters 320. The advanced scenario-based alert generation and processing system 200 may also provide system reporting 312 which could include information such as error reporting, system performance, or other desired and relevant information.

Figure 9A:
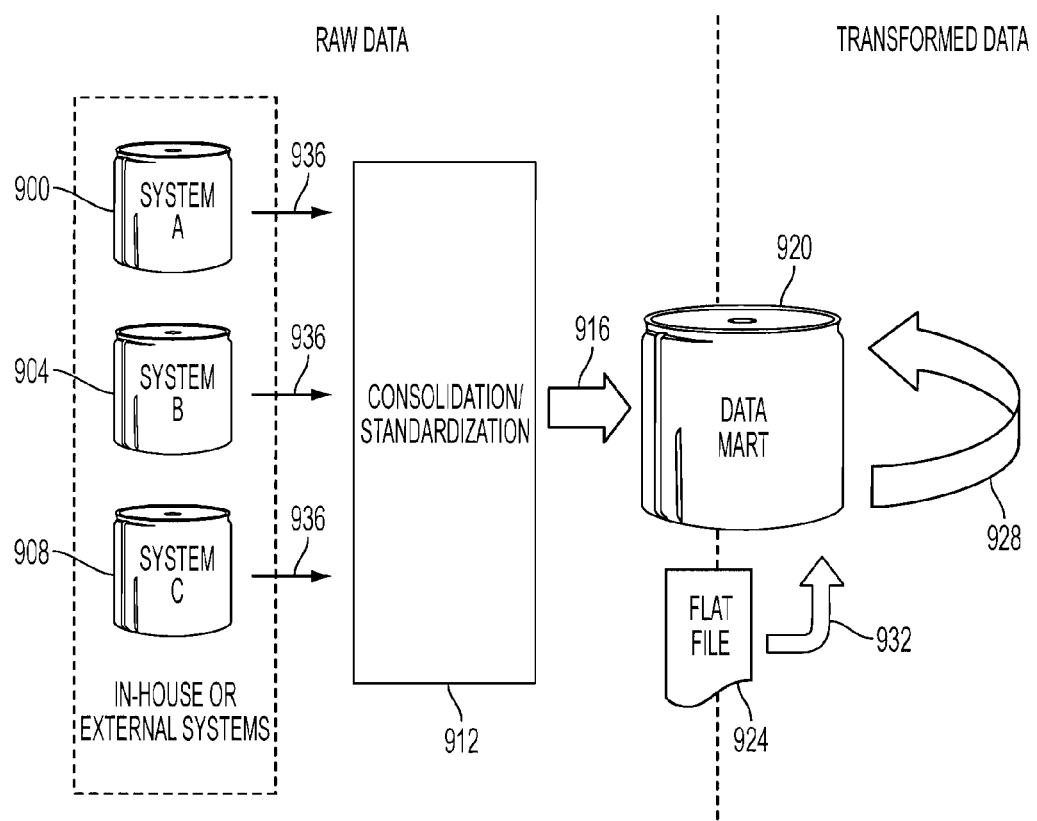
FIG. 9A represents a data transformation process.

The advanced scenario-based alert generation and processing system 200 can receive raw data 208 from the data system 204 at which point the advanced scenario-based alert generation and processing system 200 will transform the data and send back transformed data 212 to the data system 204. The process of transforming data is illustrated in FIG. 9A and described below in the text accompanying FIG. 9A. Preferably, the advanced scenario-based alert generation and processing system 200 will provide verification 216 of the data integrity through any of a variety of error detection processes that will be readily known to those skilled in the art. The advanced scenario-based alert generation and processing system 200 will then send a data query 220 to the data system 204 in which historical data 224 will be retrieved as input for the advanced scenario-based alert generation and processing system 200. Once the historical data 224 is available for the advanced scenario-based alert generation and processing system 200, then detection algorithms 228 will be accessed for selection 232 and execution 236 of the desired and appropriate algorithm.

Figure 6:
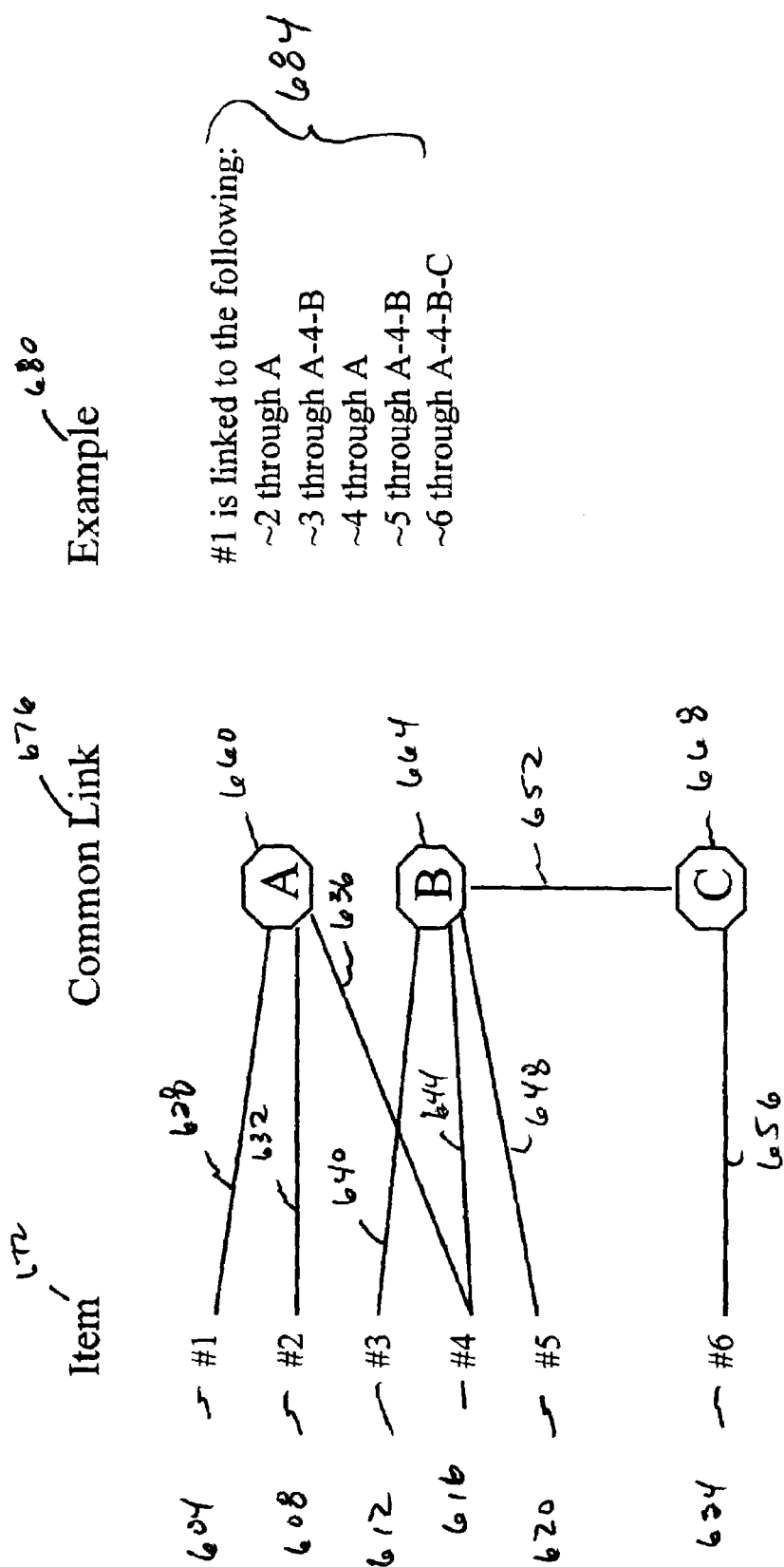
FIG. 6 is a representation of link analysis.

There are a variety of detection algorithms 228, which can be applied. The types of algorithms include, and are not limited to, link analysis, sequence matching, outlier detection, rule patterns, text mining, decision tree, and neural networks. Link analysis is an advanced behavior detection algorithm that performs an analysis of seemingly unrelated accounts, activities, events, and behaviors to determine what possible links exist and hidden relationships may exist. FIG. 6, which will be described in greater detail later in this document, is illustrative of link analysis. Sequence matching is used to identify a range of events, behaviors, or activities in a pattern of relevant sequences. While a single event, behavior, or activity may not always be interesting, when compared to the position of such event, behavior, or activity within a larger context, then certain interesting trends or sequences may be detected. FIG. 7, which will be described in greater detail later in this document, is illustrative of sequence matching. Outlier detection examines data values to determine specific events, behaviors, or activities that fall outside of a specified statistical range. A simplistic approach is to use regression modeling in identifying outliers, which are beyond a specified standard deviation. A more sophisticated approach is to identify outliers in context of data clusters where multiple data clusters may exist rendering a regression model ineffective.

Figure 8:
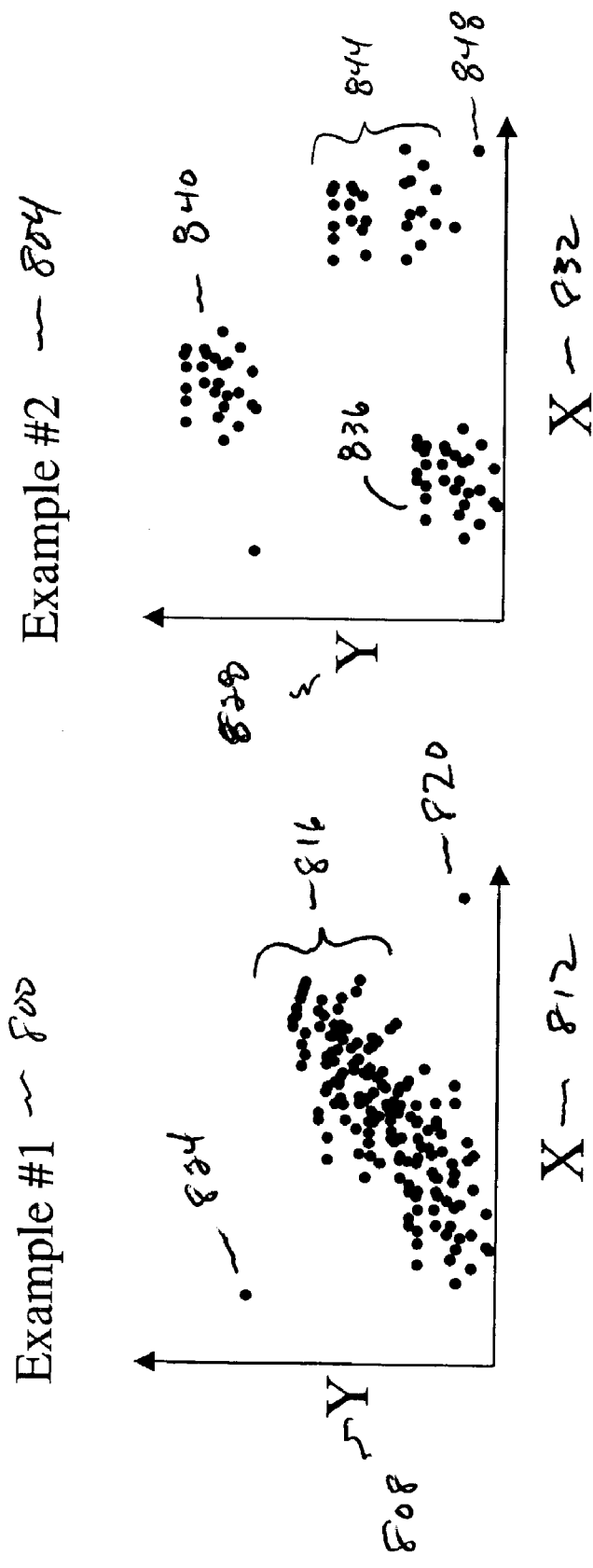
FIG. 8 is a representation of outlier detection.

FIG. 8, which will be described in greater detail later in this document, is illustrative of outlier detection. Rule pattern detection implements conditional statements when analyzing data, generally in the form of "if then" statements. Text mining algorithms examine the data for specific text phrases, sequences, or information, that can be provided as input to the behavior detection. Decision tree and neural networks are related approaches that examine sequence of events, behaviors, or activities using logical rules or specific networks well known by those skilled in the art.

Additional algorithms may also be accessed by the advanced scenario-based alert generation and processing system 200 in identifying interesting behaviors, events, activities, or transactions. Once a detection algorithm has been selected, the advanced scenario-based alert generation and processing system 200 will then access the scenario library 284 in applying the relevant and appropriate scenario, in conjunction with the detection algorithm, to create matches of desired behaviors, activities, or events in a complex environment. The scenario library 284 may contain a plurality of advanced scenarios and basic scenarios in identifying activities, behaviors, or events of interest.

The advanced scenario-based alert generation and processing system 200 may send a query 304 to the scenario library 284 accessing a specific scenario. The scenario library 284 will then retrieve 300 the selected scenario and send back to the advanced scenario-based alert generation and processing system 200. Based on the specific scenario retrieved, the advanced scenario-based alert generation and processing system 200 will then send a data query 220 to the data system 204 in which historical data 224 will be retrieved as input for the advanced scenario-based alert generation and processing system 200. In addition, the advanced scenario-based alert generation and processing system 200 may send to the scenario library 284 requests to modify scenario 296 or create scenario 292. The scenario library 284 will then confirm library 288 to the advanced scenario-based alert generation and processing system 200. The flexibility and capability to add or modify elements of the scenario library 284 and detection algorithms 228 allow the advanced scenario-based alert generation and processing system 200 to be continuously upgraded and dynamically maintained. Once the desired and appropriate detection algorithm has been selected and the desired and appropriate scenario applied, the advanced scenario-based alert generation and processing system 200 will process the data in creating alert generation 244 which will be sent to the user 128. Furthermore, the advanced scenario-based alert generation and processing system 200 will send to the user 128 a data summary 248 as related to the alert generation 244, providing the user 128 immediate access to relevant information related to the detected activity, behavior, or circumstances. The user 128 may then send a request for data detail 252 to the advanced scenario-based alert generation and processing system 200 which will then provide additional, underlying data as related to the data summary 248 and alert generation 244. The advanced scenario-based alert generation and processing system 200 will then send the data detail 256 to the user 128 based on the request for data detail 252 performed earlier.

This additional information, when combined with the original information received, allows the user 128 to elect an alert status change 260 which is transmitted back to the advanced scenario-based alert generation and processing system 200. Furthermore, the user 128 may provide supporting information 264 back to the advanced scenario-based alert generation and processing system 200. This supporting information 264 may include, but is not limited to, comments, findings, opinions, or other data in supporting the user 128 request to implement an alert status change 260. In addition, user 128 may request from the advanced scenario-based alert generation and processing system 200 additional historical information as captured in the request for historical information 268. This may provide the user 128 additional information in which to place the context of the alert generation 244. The advanced scenario-based alert generation and processing system 200 will then send to the user 128 the history information 272 that was requested earlier. Furthermore, the user 128 may send a report request 276 to the advanced scenario-based alert generation and processing system 200, which will then provide the desired information through the report generation 280 back to the user 128.

Figure 4:
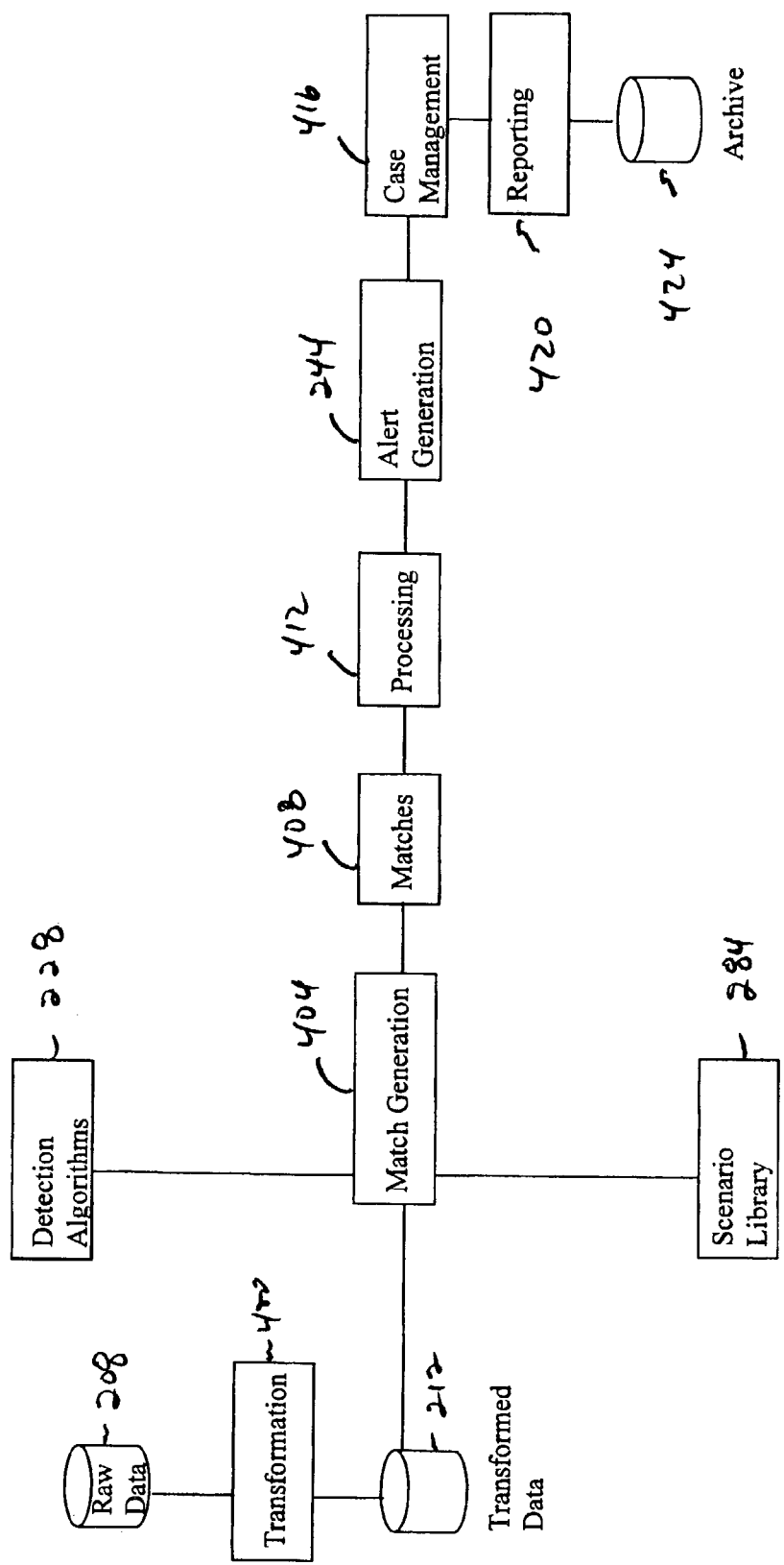
FIG. 4 is a block diagram representing the advanced scenario based alert generation and processing system.

FIG. 4 represents a block diagram of the advanced scenario based alert generation and processing system 200. Raw data 208 is converted through a transformation step 400, elements of which are described below and in FIG. 9A. The output of the transformation step is saved as transformed data 212. Match generation 404 then can access the transformed data 212, detection algorithms 228, and scenario library 284. The scenarios in scenario library 284 can be represented as parameters and logic that specifically relate to the behavior of interest. In one embodiment, these parameters and logic are coded in Extensible Markup Language (XML). In one embodiment match generation 404 is written in C++ and retrieves the parameters and logic from the XML representation in scenario library 284, allowing the detection algorithms written in C++ to operate on the transformed data. The match generation 404 then generates matches 408, which then go through processing 412 where they are grouped and prioritized. Processing 412 is a key component of the overall system. Incorporated in processing 412 is the ability to prioritization or weigh different elements of the activity, event, or behavior of interest. Alert generation 244 can receive processed (grouped and prioritized) matches from processing 412, and in one embodiment, store those matches as an XML file. In many cases, individually identified events, behaviors, or activities of interest may be relatively minor. However, when viewed within a broader context as part of other transactions, then the cumulative value becomes much greater than the individual elements. As such, a grouping of activities, events, and behaviors of interest provides an advanced capability not presently available. Furthermore, the prioritization allows for greater segmentation of the data so that matches with higher impact or importance receive greater attention or are more quickly considered.

Figure 20:
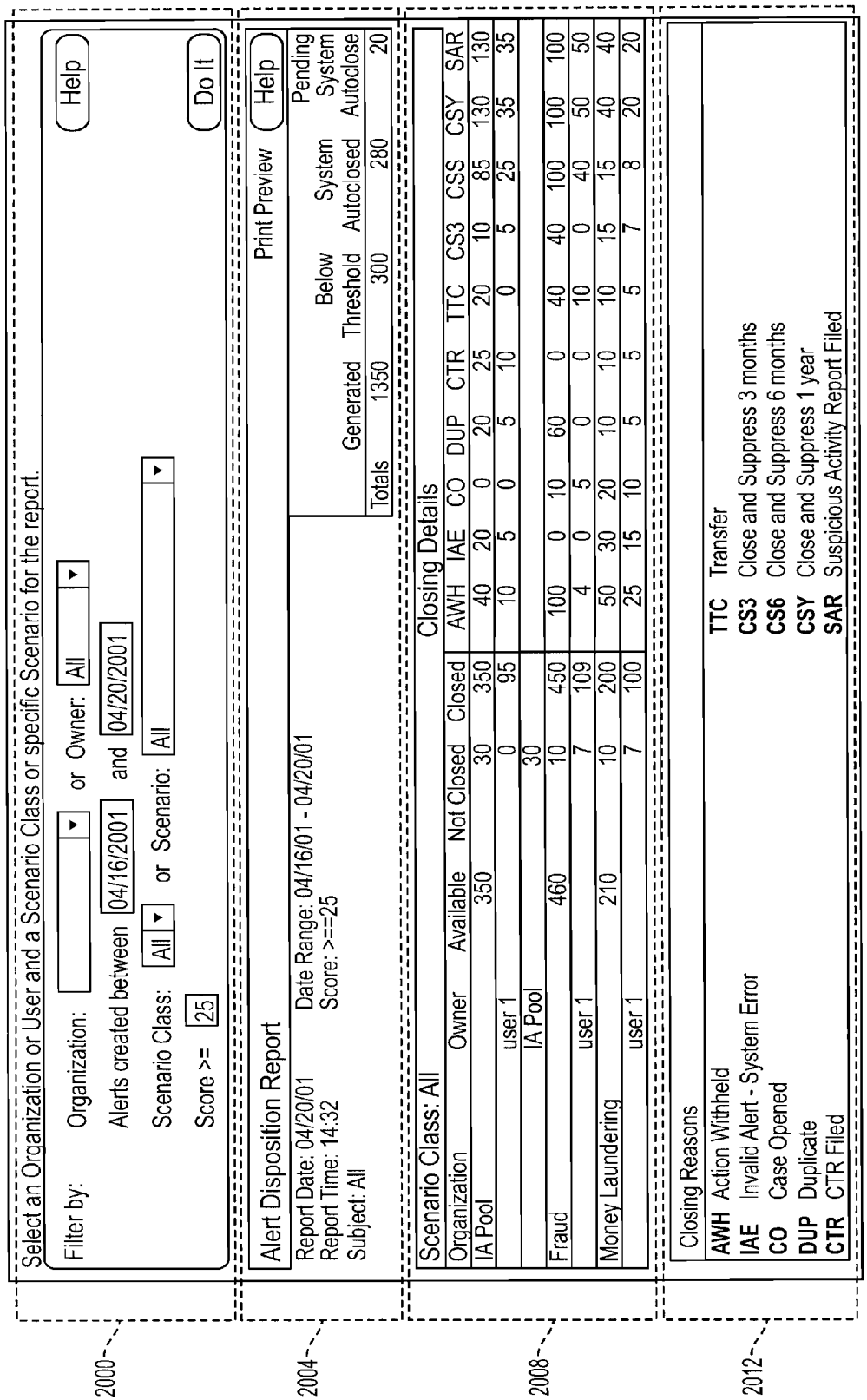
FIG. 20 illustrates a graphical user interface for alert disposition.

Referring again to FIG. 4 the alert generation 244 transfers relevant information regarding behaviors, activities, and events of interest into case management 416. In case management 416, the information is further reviewed, analyzed, and investigated. Case management 416 is a set of tools and user interfaces that allow alerts to be reviewed, analyzed, and investigated by a human operator. Case management 416 also allows a user 128 to enter data related to an alert, closeout an alert, refer that alert to another user, or perform other types of case management tasks on an individual alert. In one embodiment case management provides a user interface such as that shown in FIG. 16, including a high-level description of the alert. Case management 416 also supports the filtering of the alerts using, for example, the fields shown in filtering elements 1600. Case management 416 can also provide user interfaces such as those shown in FIGS. 17 and 18. When alerts are stored in an XML format, a number of commercially available case management tools can be used to access and assist a human in processing those alerts. Examples of commercially available case management tools include, but are not limited to TightLink CIS 3™ and Syfact™. In one embodiment, a web-based application written in Java is used for case management 416. Additional information is saved and the alert is processed, at which point, the information is transferred to reporting 420 and later saved through in archive 424. Examples of the output of reporting 420 are illustrated in FIGS. 19 and 20 where workload management and alert dispositioning are shown respectively. A number of commercially available reporting tools can be used to report on workload management, dispositioning, and other areas of interest. Examples of commercially available case reporting tools include, but are not limited to Crystal Reports™ sold by Crystal Decisions, the product manufactured by Statewide Data Warehouse and sold under the product name Brio™, or the e.Reporting Suite™ offered by Actuate. In one embodiment, a web-based application written in Java is used for reporting 420. The ability to save the alert data and related workflow activities in archive 424 is beneficial in that it allows the methodology used in the alert data and methodology used to establish workflow to be recalled and modified as necessary.

Representative code included herein includes sub-sections describing link analysis, sequence matching, outlier detection, and rules-based detection as it pertains to match generation 404. These sub-sections instruct the system to access transformed data 212, select detection algorithms 228 and apply the appropriate scenario library 284 in the match generation 404 process. Once the match generation 404 has been completed, then the next step in the advanced scenario-based alert generation and processing system 200 is the processing 412 of matches identified in the match generation 404 sequence. Processing 412 includes the processes of prioritization, group, and alert prioritization of the matches 408. The prioritization sub-section in the representative code describes a computer-based approach for receiving match information and prioritization strategy logic. This sub-section then evaluates the matches 408 based in order to assign a ranking or prioritization which is an output of the advanced scenario-based alert generation and processing system 200. The grouping sub-section in the representative code describes a computer-based approach for accessing a set of prioritized matches and grouping strategy logic. The grouping process then evaluates prioritized matches and creates group associations based on the grouping strategy logic. The grouped prioritized matches form an output of the advanced scenario-based alert generation and processing system 200. The alert prioritization sub-section in the representative code describes a computer-based approach for receiving a set of grouped matches and alert prioritization strategy logic. The alert prioritization process then evaluates the grouped matches based on the alert prioritization strategy logic in order to assign an alert prioritization. The group matches can then be output based on alert prioritization by the advanced scenario-based alert generation and processing system 200 which would proceed on to the next step of alert generation 244.

Figure 16:
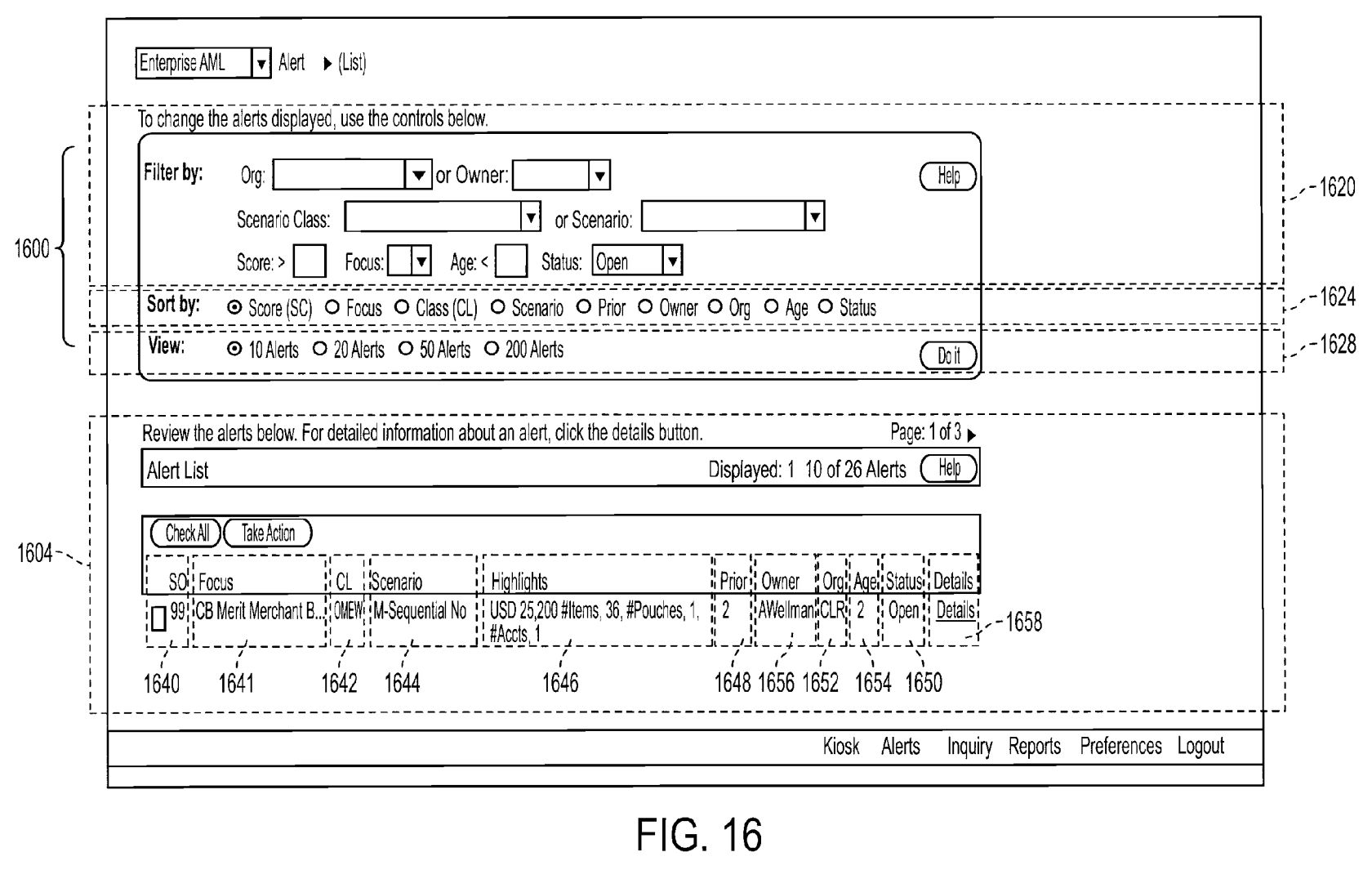

FIG. 16 is an illustration of a graphical user interface for alert display, alert filtering, and alert viewing. Prioritization column 1640 displays the numeric value associated with the alert prioritization. A user 128, domain expert 108, developer 104 or administrator 136 may modify the visual presentation of alerts based on the alert prioritization.

FIGS. 17 and 18 are representative of a graphical user interface for display information related to case management 416. FIGS. 19 and 20 are representative of a graphical user interface displaying information related to reporting 420. The representative code that facilitates these processes can be written in a variety of computer languages including, but not limited to, Java, C, and C++.

Figure 5:
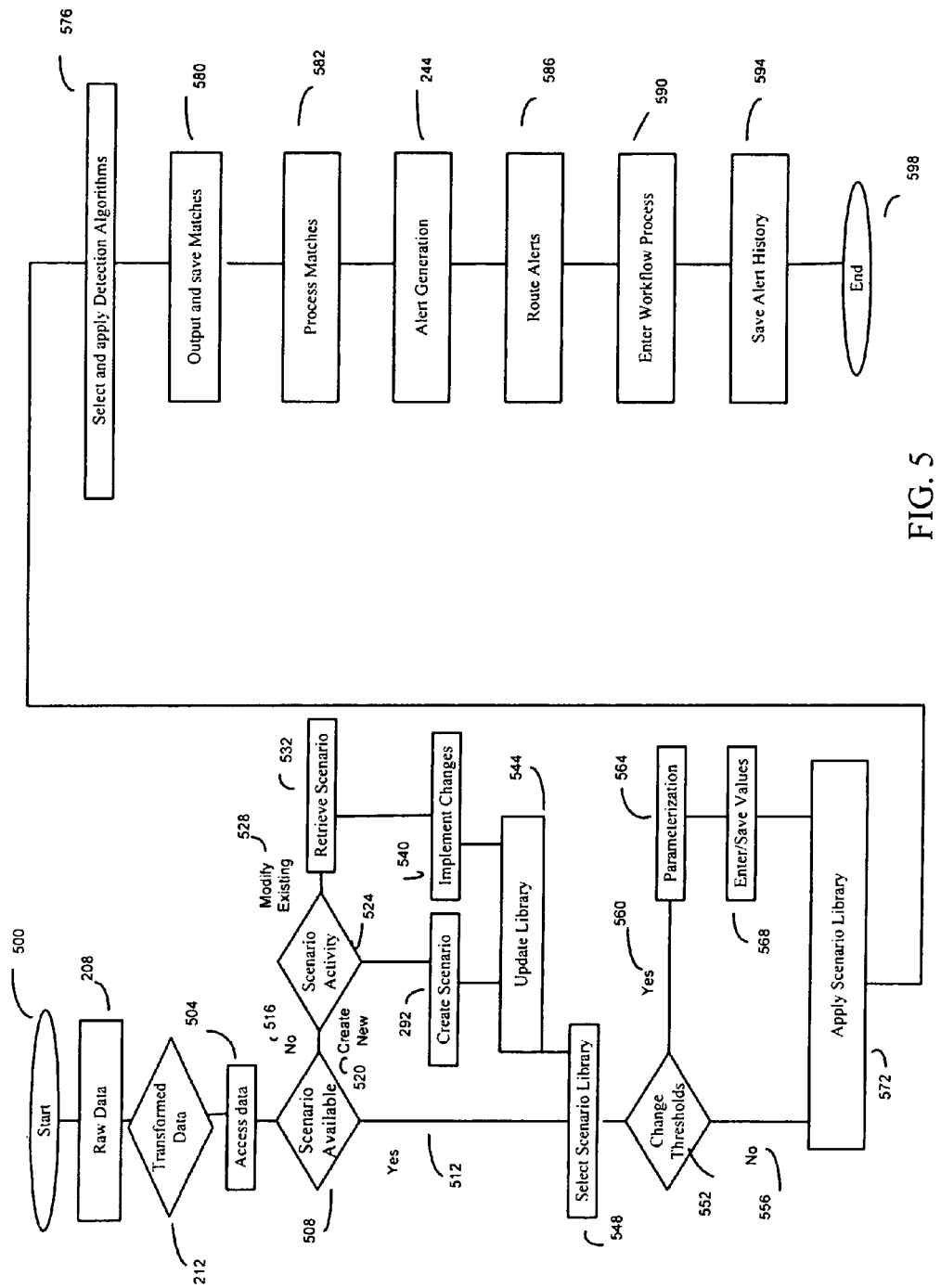
FIG. 5 is a flowchart representing the advanced scenario based alert generation and processing system.

FIG. 5 illustrates a flow diagram of the elements of the advanced scenario-based alert generation and processing system 200. Upon system start 500, raw data 208 is accessed by the system which is then transformed resulting in stored transformed data 212. The advanced scenario-based alert generation and processing system 200 will then access data 504, which is included in the match generation 404 process. At that point a scenario available test 508 is performed resulting in a scenario available result 512 or a scenario not available result 516 a decision must be made as to whether or not a scenario available 508 exists. If a scenario available test 508 is performed resulting in a scenario available result 512, then the system will select scenario library 548. If the a scenario available test 508 is performed resulting in a scenario not available result 516, then another decision point scenario activity test 524 must be performed which considers whether scenario activity modify 528 or scenario activity new 520 activity must be performed. If decision point scenario activity test 524 is performed resulting in a scenario activity new 520, then the flow proceeds to create scenario 292 process. Once the new scenario has been created, update library 544 is performed and then the system moves to the select scenario library 548 process.

Figure 13:
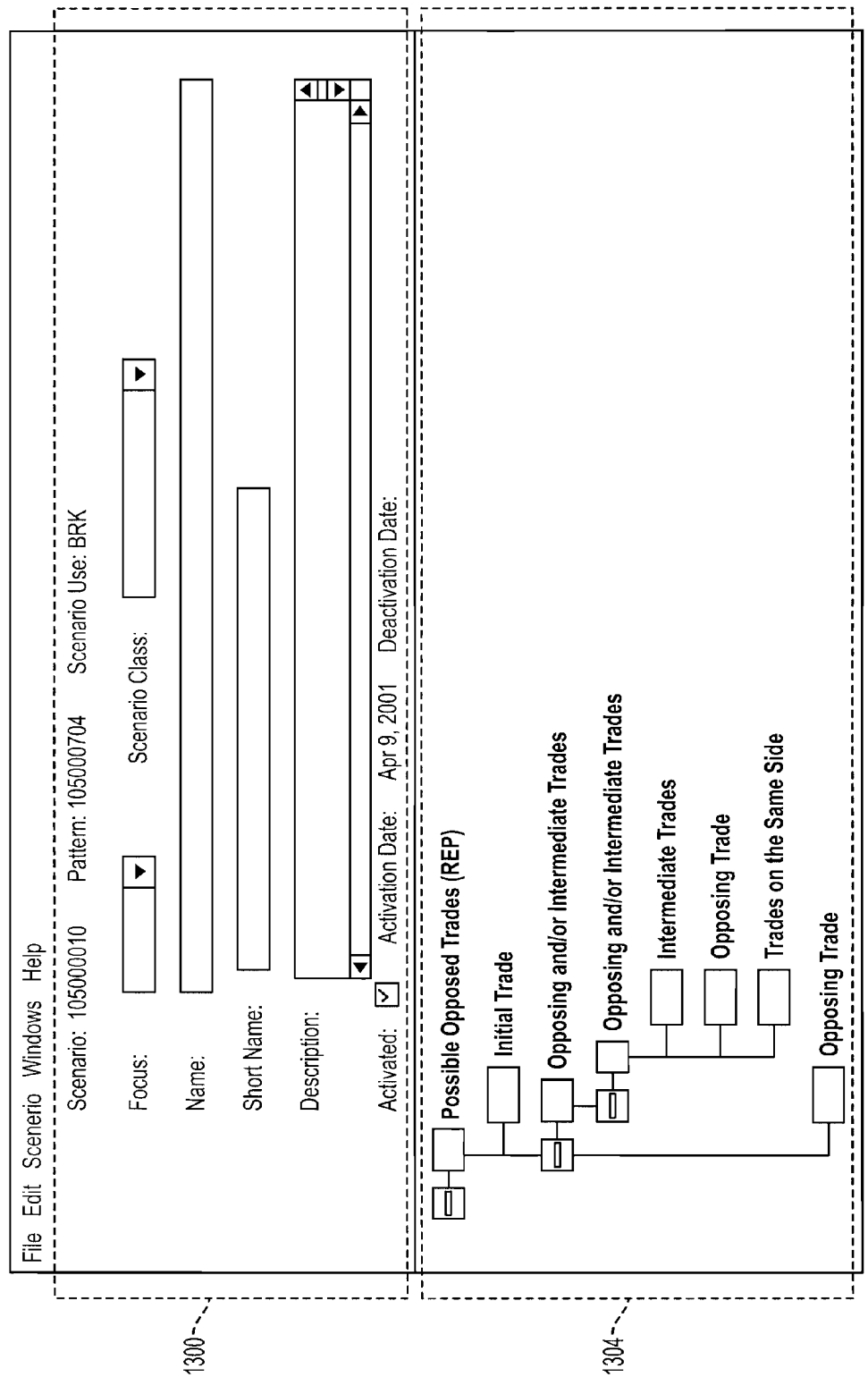
FIG. 13 illustrates a graphical user interface for a sequence scenario editor.

If decision point scenario activity test 524 is performed resulting in a scenario activity modify 528, then the system must retrieve scenario 532 and implement changes 540 prior to update library 544. Again, once the update library 544 step has been completed, then the system enters the select scenario library 548 process. In one embodiment, the create scenario 292, implement changes 540, and parameterization 564 are performed during an off-line sequence and not as part of the advanced scenario-based alert generation and processing system 200. FIG. 13 represents one specific example of a scenario from the scenario library 548 that has been displayed through a graphical user interface. FIG. 13 describes the selected scenario and provides a high-level description of the process flow that advanced scenario-based alert generation and processing system 200 will execute. At that point, another decision must be made as to whether or not to change thresholds test 552. If change thresholds test 552 is performed resulting in a change threshold not required 556, then the system proceeds to apply scenario library 572. If change thresholds test 552 is performed resulting in a change threshold required 560, then the system will allow the user to enter parameterization 564 and the information will then flow to the enter/save values 568 process prior to entering apply scenario library 572.

Figure 14:
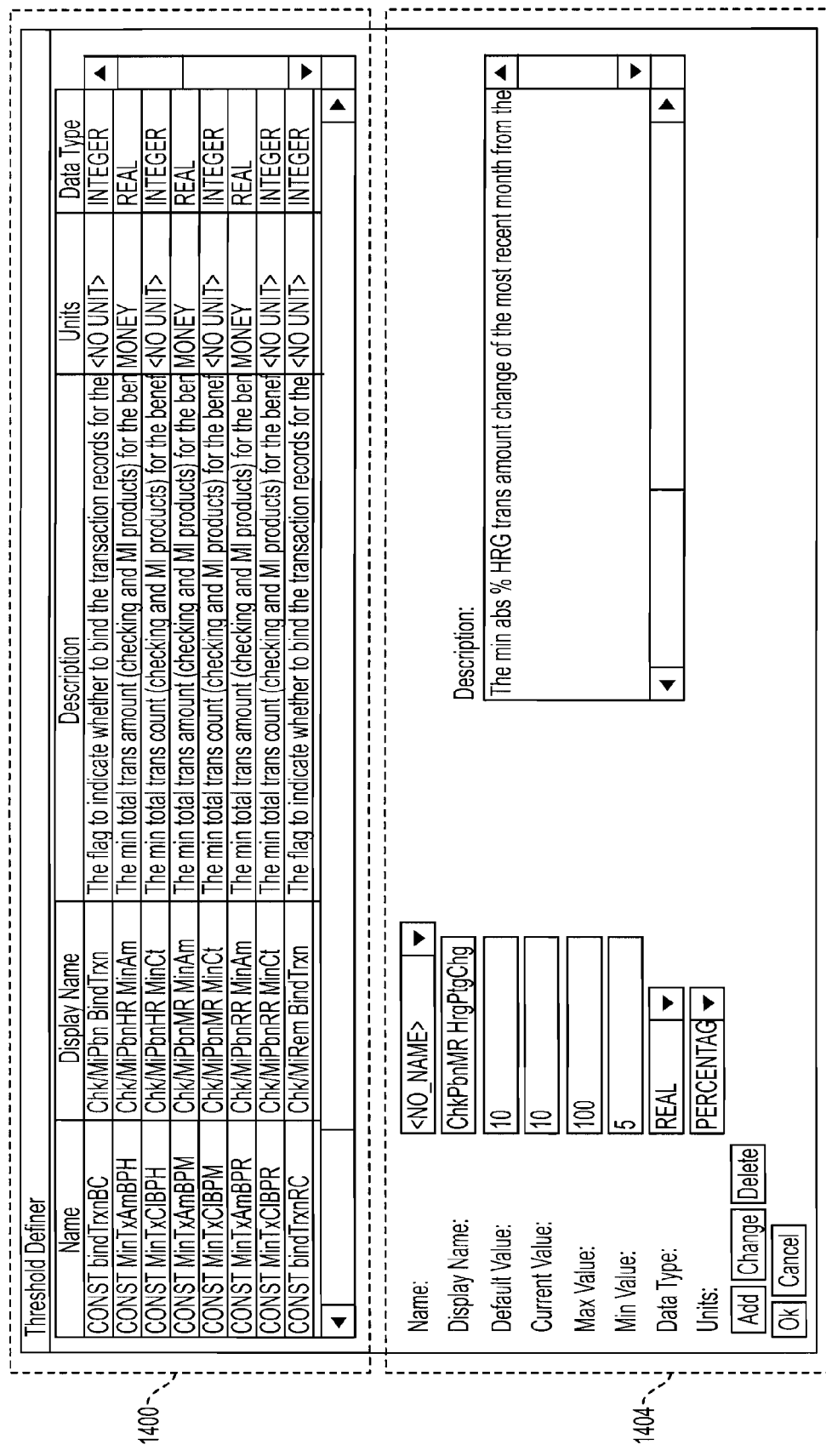
FIG. 14 illustrates a graphical user interface for a threshold definer.

FIG. 14 represents an example of parameter values for a particular scenario. In the parameterization 564 step, the logic or values of a scenario may be modified providing added flexibility and capability in detecting events, entities, and behaviors of interest. The system will then select and apply detection algorithms 576, output and save matches 580, process matches 582, alert generation 244, route alerts 586, enter workflow process 590, save alert history 594, and then end 598 the sequence. The process matches 582 step is included in the processing 412 sequence. The route alerts 586 and enter workflow process 590 steps are included in the case management 416 sequence. The save alert history 594 step is included in the archive 424 sequence.

A basic scenario is a simplified approach to defining events and entities that are known to be indicative of a behavior of interest. Basic scenarios typically have a single type of event or entity, or a small number of events and entities that operate on a set of data to determine if the scenario of interest is present. An example of a basic scenario is exception reports. An exception report flags individual transactions and simply produces a list of transactions abstracted from the context in which they occurred. Evaluation of the exceptions based solely on the information provided in the exception report is difficult and in some cases impossible.

Basic behavior detection is a method of detection that hinges on the observance of a single event or a simple aggregate of events. As an example, basic behavior detection of money laundering could be performed by defining a basic money laundering scenario of "all cash transactions over $10,000" and generating an exception report indicating all of those transactions. The difficulty with this approach is that the exception report would do nothing more than indicate all events fitting that particular basic scenario definition and would inherently have a high false alarm rate. In the example given, many, if not all of the transactions identified would be legitimate, and not be indicative of the basic behavior of fraud.

Figure 10:
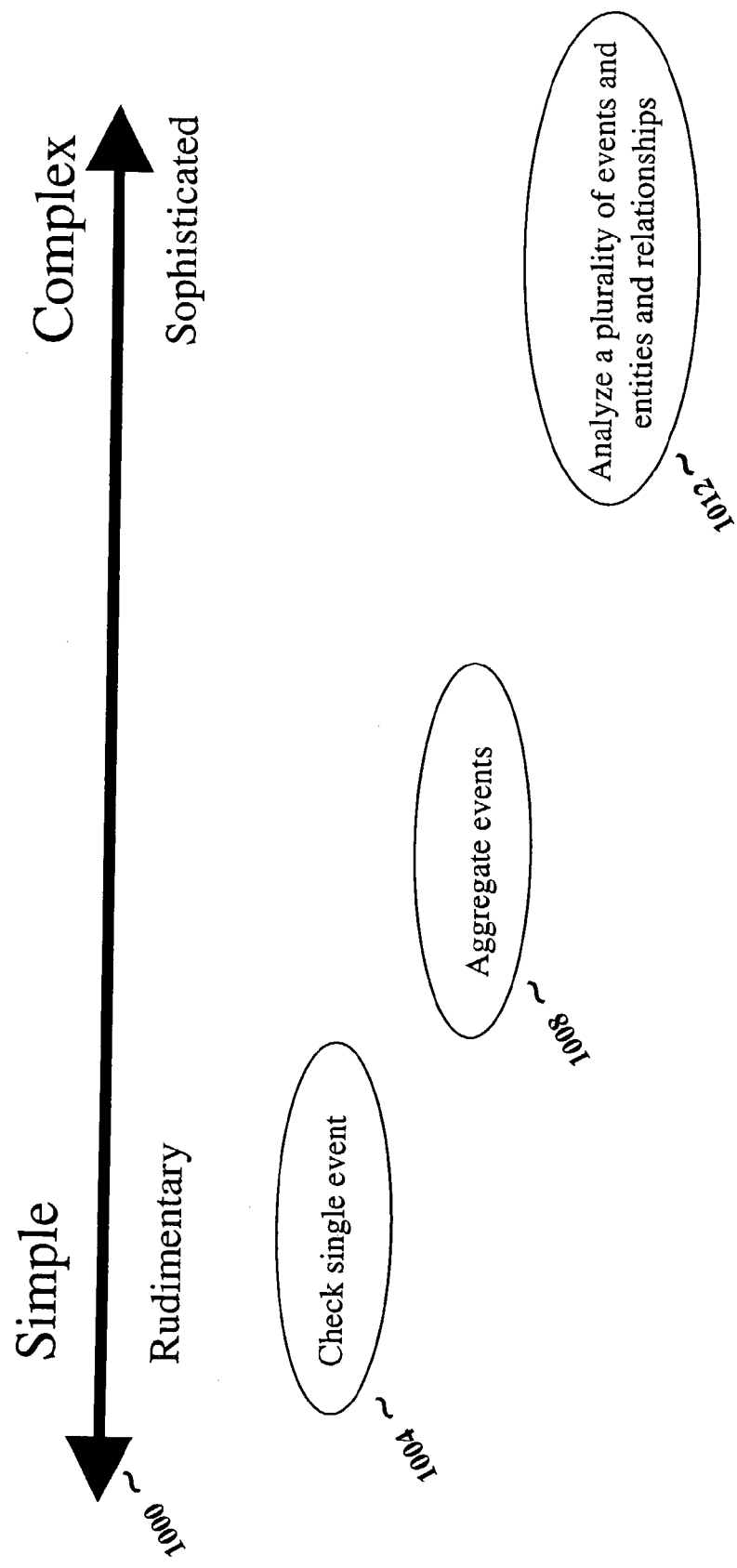
FIG. 10 illustrates the range of complexity in behavior detection problems.

FIG. 10 represents a scale of complexity for behavior detection. Scale 1000 represents the spectrum of simple detection using rudimentary approaches to complex detection using advanced scenarios. Check single event 1004 represents solutions based on the evaluation of a single data event or transactions in assessing behavior. Examples include, but are not limited to, currency transactions above a certain size, phone calls made by a consumer above/below certain thresholds, or web site visits to a particular site. Filtering or other approaches can identify behaviors, activities, or events of interest based on a single criteria, but the reliability with which the behavior is detected will typically be low. Aggregate events 1008 represents approaches incorporating the use of multiple event tests for determining behavior, activities, or events of interest. An example could be to identify customers whose total purchases equaled a certain threshold during a period of time. This would then aggregate all customer purchases in identifying those customers whose behaviors are of interest.

Other basic scenarios for fraud might include premature IRA distribution, identifying entities or account holders that are high-risk or are in high-risk geographies, and other such scenarios or attributes that are known to be indicators of the specified behavior. Although these basic scenarios can be useful in identifying the behavior of interest, it is often times the case that those committing the behavior are aware of the basic scenarios, and will modify their behaviors, actions, and activities to avoid detection.

An advanced scenario creates a rich package of information that allows the behavior of interest to be observed or investigated in context. An advanced scenario will contain the elements of focus, highlights, and specific events and entities. In the embodiments, an advanced scenario will also include parameterized logic.

A focus is a centralized event or entity upon which the behavior can be further investigated. As an example, a customer that is suspected of laundering money can form a focus. Another example would be a central account that is linked to a number of other accounts. Although all of the accounts would be subject to investigation and tied to the alert, the focus is the central account. An illustration of the presentation of focus is shown in the focus column 1641 of alert list 1604 as shown in FIG. 16.

Highlights are summarizations of the events and entities involved in an alert representing a behavior. An example would be the total dollar amount passed through an account or the total number of transactions in that account. The highlight summarizes and specifically points out why a set of events, a set of entities, or a set of events and entities is of interest, but does not list those specific events and/or entities. An illustration of the presentation of highlights is shown in the highlights column 1646 of alert list 1604 as shown in FIG. 16.

An advanced scenario links the alert to the specific events and entities that have resulted in the generation of that alert. An example would be a set of accounts that are allegedly part of a money laundering ring (entities) and the deposits into and withdrawals from those accounts (events). An illustration of the specific events and entities that can result in the generation of an alert are shown in alert details 1704 of FIG. 17.

An advanced scenario contains logic that determines whether or not a match and alert will be generated. This logic contains parameters, accessible to the user 128 or administrator 136 through a user interface, that can be varied to set a threshold or vary a rule to generate a match and alert. An example of parameterized logic is "a money laundering ring must include x different accounts and y different transactions." In this example, x and y could be set to 3 and 40 respectively, and those values would be altered, by a machine or a user, based on the number of false positives generated. An illustration of parameterized logic is shown in the threshold parameters section 1404 of FIG. 14.

Advanced behavior detection requires the analysis of a plurality of events and entities, and the relationships between events, between entities, or between events and entities. As an example: a drug dealer wants to get large amounts of cash into the banking system, but knows that if he/she deposits cash, the bank will file a government form on him/her. To avoid detection the dealer decides to buy money orders with the cash because money orders are regulated less rigorously. The dealer also knows that if he/she buys $3,000 or more in money orders at one time, the dealer has to supply a personal identification. To avoid this the dealer travels around to several convenience stores, and at each the dealer buys five $500 money orders. The dealer then deposits all the money orders at the bank, but to avoid suspicion, makes the deposits at several branches over several days into several accounts. The dealer later consolidates the money into one account and wires it to an account in the Cayman Islands. The dealer used several bank accounts that on the surface looked independent (probably different names, addresses, etc.), but they were in fact being controlled by one person in order to launder money. The serial numbers on his money orders also were in sequential groups of five. Even if these were deposited into separate accounts, the repeating sequences of five $500 money orders could point to someone trying to stay below the $3,000 ID threshold if the relationship among the deposits is detected. One embodiment of the invention uses link analysis and sequence matching algorithms designed to find hidden relationships among events and entities. Link analysis takes pairs of linked entities and pieces this information into larger webs of interrelated entities. Sequence matching is employed when the sequence of events (such as the time sequence) contains some important clue into hidden relationships. Many of the most insidious scenarios can only be solved with this type of complex analysis because the behavior is spread over many events over multiple entities over a range of time.

The use of advanced behavior detection 1012 is illustrated in FIG. 10 wherein a plurality of events and entities are monitored, and wherein the relationships between those events and entities can be tabulated, analyzed, and monitored using algorithms described herein. Alerts can be generated based on the events and entities monitored, and the alert reporting can include reference to these specific events and entities such that the details of those events and entities can be readily accessed.

One way of viewing advanced behavior detection is an n-dimensional approach in which several types of events and entities are simultaneously considered across at least products and lines of business in order to identify the behavior of interest. The advanced behavior detection can be based not only on the events and entities that are known to be indicative of a behavior of interest, but also on the relationships, temporal or spatial (e.g. physical or electronic location) between those elements.

Figure 3:
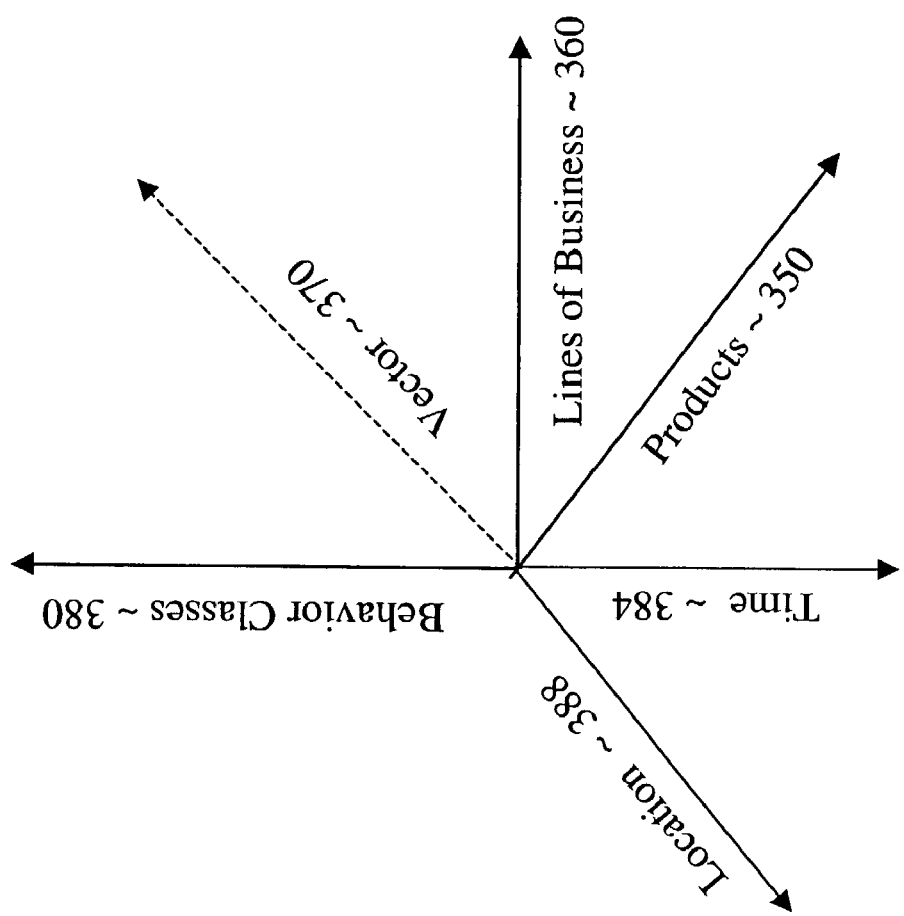
FIG. 3 illustrates an n-dimensional space describing the problem of behavior detection.

FIG. 3 illustrates an n-dimensional representation of the problem of behavior detection. Time axis 384 represents the time at which an event occurs. Location axis 388 represents the virtual or physical location of an entity or an event. Products axis 350 may relate to a variety of goods or services with examples including, but not limited to, financial services, telecommunications, healthcare, and consumer goods. As an illustration, products axis 350 for the financial services industry may include equity, bonds, commodities, and/or options; for the telecommunications industry may include data, wireless services, land-line and/or pager services; for the healthcare industry may include MRI, X-ray, office visits and/or blood work; and for the consumer goods industry may include food, cosmetic, over-the-counter medicines and/or jewelry. Lines of business axis 360 can be defined as the type of business involved: examples include, but are not limited to, retail, wholesale, private and institutional types of business. Behavior classes axis 380 represents a range of behaviors that is of interest, in the case of financial services these behaviors may be fraudulent behavior, money laundering, or other licit or illicit activities. In the case of health care or insurance the behavior of interest may also be fraudulent behavior. Although fraudulent behavior is very frequently the behavior of interest, good behaviors can also be specified. The vector 370 of FIG. 3 represents an additional vector(s) that may be created to provide an additional dimension for identifying targeted behaviors of interest. As an example, vector 370 could be, as applied to health care, the provider type, with the provider type being doctor, medical device, pharmaceuticals, and non-doctor service.

Referring to FIG. 3, events and entities lie somewhere within the n-dimensional space described by the basis vectors. A basic behavior can be understood to be a single point, or clustered set of points in the n-dimensional space. Basic behavior detection is the process of locating the points of interest. Advanced behavior can be understood to be a complex set of points in the n-dimensional space, not necessarily in close proximity. Advanced behavior detection is the process of identifying those points by examining the relationships among those points and mapping those relationships to the advanced scenario.

FIG. 9A illustrates a data transformation process that can be applied to the advanced scenario based alert generation and processing system 200. System A 900, system B 904 and system C 908 represent external data sources or information systems containing raw or pre-transformed data. For illustration purposes, this figure represents these three systems, although the data transformation process may access data from a single or plurality of data source or information systems. Transfer 936 represents an exchange interface that transfers raw data 208 from the data source or information systems to the consolidation/standardization process 912 where the data is converted to a consistent format. Transfer 916 represents the transfer of the transformed data 212 to a data mart 920 where the transformed data 212 is stored. Data mart 920 includes a storage device and database application in which the transformed data 212 may be stored, retrieved, and analyzed. Process 928 represents manipulation of the transformed data 212. Flat file 924 represents a pre-processed set of data that already conforms to the data format required by the system and does not need to go through the transfer 936 step. Flat file 924 can be put into data mart 920 through interface 932. This description represents one possible embodiment of the invention for transferring raw data into a defined data model wherein transformed data 212 can be accessed.

Figure 9B:
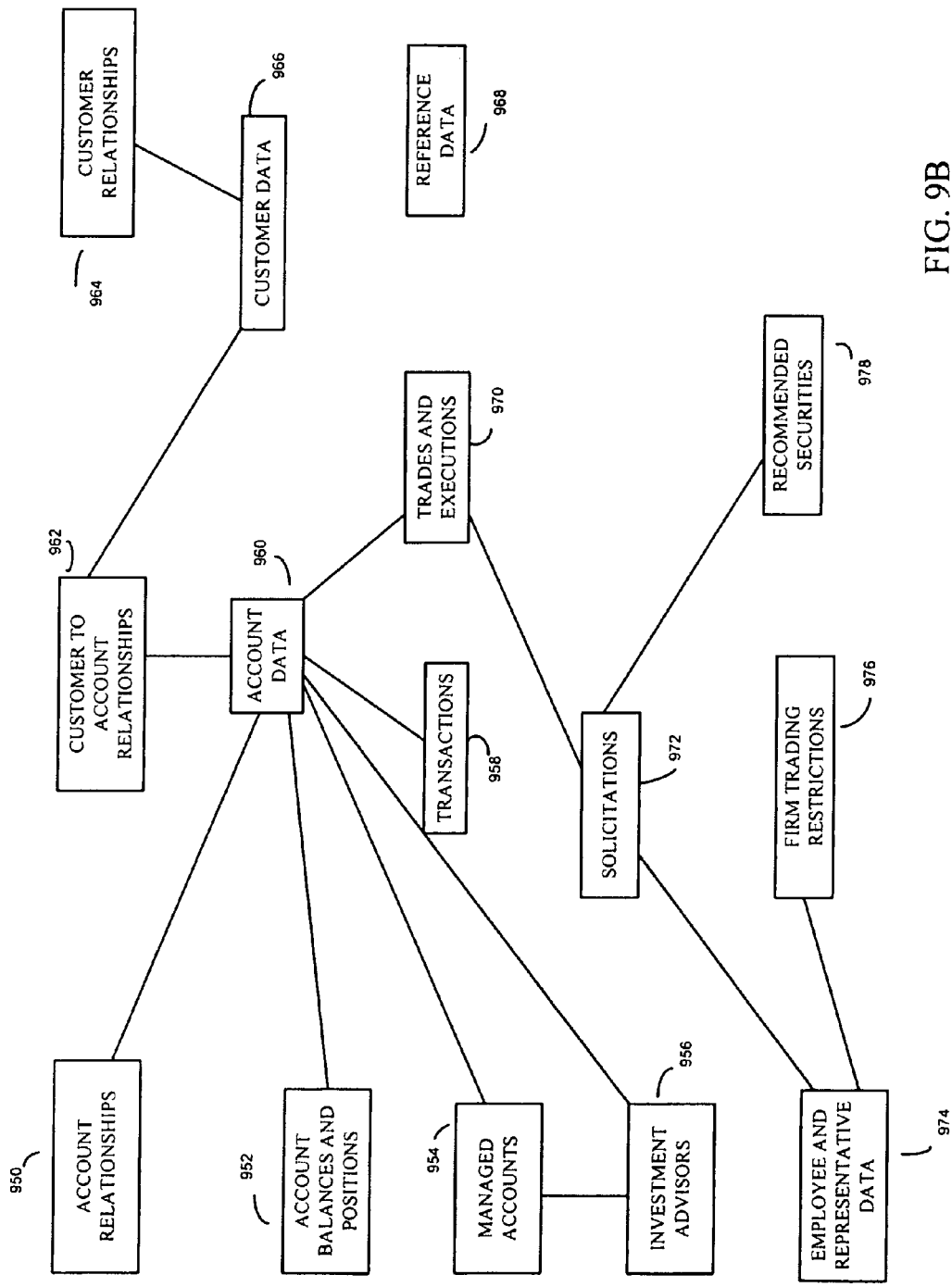
FIG. 9B illustrates representative tables involved in the data transformation process.

FIG. 9B is representative of tables involved in the data transformation 400 process. The table configuration and extracted data may vary depending upon the specific scenario or analysis being performed. FIG. 9B is representative of information being extracted and data transformed for a particular situation. Other types of tables, extracted data, and associations may be used as part of the data transformation 400 process. In one embodiment, account relationships table 950 contains information such as account restrictions, relationship between accounts, and servicing organization(s) for the account. Account balance and position table 952 contains information such as current balance, current positions, group, investment objectives, option pairing, and feature. Managed accounts table 954 contains information such as accounts managed by advisor, knowledge and approval. Investment accounts table 956 contains information such as advisor, objectives, level of authority, and accounts managed. Transactions table 958 contains information such as open trading executions and electronic transfer of funds. Account data 960 contains information such as name, address, social security, phone number, email address, and group. Customer to account relationship table 962 contains information such as relationships between customers and accounts, roles customers can assume, and anticipated transaction profile. Customer relationship table 964 contains information such as relationships between customers, trading restrictions, product knowledge, and experience. Customer data table 966 contains information such as customer name, gender, age, employer, and income level. Reference data table 968 contains information such as news, exchanges, indexes, code translator, history of changes, customers with controlling interest, list of customers, security, users, logon, list, and type. Trade and execution table 970 contains information on completed transactions and electronic transfers. Solicitations 972 contains information on securities approved for solicitation and buy/sell orders for securities approved for solicitation. Employee and representative data 974 contains information on employee, representative, and non-representative names, addresses, emails, groups, phone numbers, trading restrictions, organizations, relationships, locations, and non-trade activities. Firm trade restrictions 976 contains information on employees with trading restrictions, securities watchlist, and watchlist sources. Recommended securities 978 contains a list of securities that a firm is recommending, inventory list, pending transactions in recommended securities, transaction history of recommended securities, and record of agent or broker involved in the transaction of recommended securities. These tables or databases can be developed in a variety of computer-based languages or applications including, but not limited to, Java, C, C++, Access, dBase and products offered by Oracle and Sybase. Also, the field names may also be customized to meet individual preferences and the structure of the tables may also be constructed to account for different possible implementations. The tables represented in FIG. 9B are extracted from data contained in transformed data 212.

Link analysis provides the ability to transform customer-to-customer business activities from a data representation where they appear as individual activities between customers, to a third-party network representation where they become group activities confined in each third-party network. One advantage of link analysis is that group behaviors become more evident, and therefore are more effectively and efficiently analyzed in a third-party network representation since each group of customers connected through customer-to-customer activities becomes a single object in the network representation. The new network representation forms a third-party network platform.

FIG. 6 illustrates a link analysis algorithm. Item 672 is a descriptive element for a variety of possible categories including, but not limited to, account, entity, transaction or individual. Common link 676 is also a descriptive element for a variety of possible categories including, but not limited to, account, entity, transaction or individual. Example 680 is another descriptive element providing a specific description of linkages based on the information provided in the diagram.

Item numbers #1 604, #2 608, #3 612, #4 616, #5 620, and #6 624 represent similar categories for which behavior detection techniques and analysis are to be performed. Common link 676 categories A 660, B 664 and C 668 represent similar categories for which behavior detection techniques and analysis are to be performed. Line 628 illustrates a link between #1 604 and A 660. Line 632 illustrates a link between #2 608 and A 660. Line 640 illustrates a link between #3 612 and B 664. Line 636 illustrates a link between #4 616 and A 660. Line 644 illustrates a link between #4 616 and B 664. Line 648 illustrates a link between #5 620 and B 664. Line 652 illustrates a link between B 664 and C 668. Line 656 illustrates a link between #6 624 and C 668. Descriptive field 684 describes the link between #1 604 to all other descriptive items 672 through the various common link 676 connections.

A network detection algorithm, such as link analysis, can be utilized to identify common elements between a plurality of events, entities and activities. As the associations extend beyond the original sources, the link analysis is able to identify common elements through direct or indirect association among the various events, entities, and activities. Elements of interest are retrieved, collected, or processed from a general data source and are then stored in a separate database or dataset. As additional elements are evaluated, the matches are also stored along with the link between matching elements. This process continues for the various elements and data sources.

Link analysis can be understood from the following example: if two accounts (A&B) were registered in different names, but had a common address, then the network detection algorithm would link the two accounts because of the matched address as a result of the direct connection. If another account were introduced (Z) which shared the same phone number as account A, then accounts A and Z would be linked through that direct association. In addition, accounts B and Z would be linked through their indirect association via account A. The network detection algorithm can be applied on a variety of elements, fields, datasets, and databases in identifying connected, directly or indirectly, events, activities, and entities. By creating and storing matches between elements, network detection algorithms are able to extract data from a general data source in identifying events, entities, and activities that have either direct or indirect associations.

A specific link analysis algorithm is presented in the co-pending, commonly-owned patent application entitled "Analysis of Third Party Networks," the inventors of which are Tao Zhang and Steven Kirk Donoho, which was filed as a utility patent application on Jan. 13, 2003, having a Ser. No. of 10/341,073, and which is incorporated herein by reference in its entirety but is not admitted to be prior art. In addition, representative code corresponding to a link analysis method is provided below in the section entitled "Representative Code."

FIG. 7 illustrates the functionality of the sequence matching detection algorithm. This figure provides three examples; example #1 700, example #2 704, and example #3 708. Under example #1 700, there is a descriptive element 712, along with data sequence 716, followed by sequence matches 720, 724, and 728 that meet the test criteria established in descriptive element 712. Under example #2 704, there is a descriptive element 732, along with data sequence 736, followed by sequence matches 740, 744, and 748 that meet the test criteria established in descriptive element 732. Under example #3 708, there is a descriptive element 752, along with data sequence 756, followed by sequence matches 760, 764, 768, 772, and 776 that meet the test criteria established in descriptive element 752. This detection algorithm is particularly useful when evaluating events, activities, or behaviors in a certain sequence.

Sequence detection algorithms analyze data for specific time-based patterns. As the data is analyzed, potentially significant and meaningful data is temporarily stored in a separate database until further analysis of the remaining data stream(s) can be completed. Since a sequence detection algorithm analyzes data for specific time or occurrence sequencing of events, activities, and behaviors, the detection algorithm will analyze the entire dataset while saving potential matches until its rule-based approach can determine whether the temporarily stored data meets the sequence detection requirements. If a particular sequence of events, activities, or other behaviors have met established constraints, then a match is confirmed and the complete dataset capturing the events, behaviors, and activities of interest is saved at which point an alert is generated. If the data analyzed does not meet the established constraints, then the temporarily stored data is discarded with no alert being generated. In addition, sequence detection algorithms can be used not only in identifying events, activities, or behaviors that have occurred, but also ones that have not occurred.

Representative code corresponding to a sequence detection method is provided below in the section entitled "Representative Code."

FIG. 8 illustrates outlier detection algorithms. Example #1 800 and example #2 804 provide two such specific examples of this algorithm, which is not an exhaustive list of potential examples. Under example #1 800, Y axis 808 and X axis 812 define the parameters for the data. Cluster 816 represents various data points based on the Y axis 808 and X axis 812. Datapoints 820 and 824 represent outliers which are significantly beyond the cluster 816. In example #1 800, the normal approach would be to use statistical analysis and regression modeling in identifying points which are statistically significant meaning beyond several standard deviations away from the mean. Example #2 804 includes Y axis 828, X axis 832, clusters 836, 840 and 844 with datapoints 848 and 852. In example #2 804, traditional statistical analysis and regression analysis would be not effective. The clustering affect would create a higher standard deviation and make it more difficult in detecting outliers. Another approach, especially when used when multiple clusters are present, is to compare distances between data points within a cluster first and then comparing that information with other points outside the clusters in determining whether or not they are outliers. In example #2 804, cluster 844 is relatively close to datapoint 848. As such, in example #2 804, the only outlier identifiable is datapoint 852 which is significantly separate from plotted clusters. In either example, outliers represent behaviors, activities, or other events well beyond the average, mean, or other benchmark calculation.

Representative code corresponding to an outlier detection method is provided below in the section entitled "Representative Code."

Algorithms for link analysis, sequence matcher, outlier detection, rule pattern, text mining, decision tree, and neural networks are commercially available from a variety of vendors, including, but not limited to SAS Institute and their Enterprise Mining application, SPSS Inc. and their Predictive Analytics™ application, International Business Machines (IBM) and their DB2 Intelligent Miner™ application, Visual Analytics and their VisuaLinks™ application, and NetMap Analytics with their NetMap™ Link Analysis application with these various applications containing software and algorithm technologies.

As matches are identified through the detection algorithm analysis, the matches are then prioritized based on a rules-based methodology. Identified events, entities, or transactions of interest are then evaluated based on user defined logic to determine the relative prioritization of the match. The prioritization value is saved with the match. In addition, the invention can then group events, activities, and transactions prior to transferring the alert into the routing and workflow process. The prioritization and grouping are performed based on pre-defined criteria including parameters related to amounts, number of events, types of events, geographic location of entities and events, parties involved in the events, product lines, lines of business, and other parameters relevant to the type of behavior of interest. These parameters can be modified by the user 128, administrator 136, domain expert 108, or developer 104. During this step, summary information of the alert and associated dynamic link to the alert details is saved along with prioritization and grouping information. The alert details will vary on the event and entity of interest but examples include account details such as account holder name, address and phone number, account balance, amount of a transaction or series of transactions, recipient of a transfer or deposit.

Representative code corresponding to prioritization and grouping methods are provided below in the section entitled "Representative Code."

Once an alert has been prioritized and grouped, the invention allows for a computer-based approach in routing the alert and managing the workflow process for greater efficiency and effectiveness. Based on the prioritization and grouping of the alert, the invention routes the alert based on pre-determined instructions. As the alert is reviewed, investigated, and processed, the invention provides highlight information and dynamic links to detailed information thereby expediting and facilitating this step. In addition, the invention stores the historical data and investigation data for later review and retrieval if necessary. The invention allows the alert to be visually presented in a variety of formats, which can be selected by the user 128, administrator 136, domain expert 108, or developer 104 and modified based on filtering elements.

Figure 12:
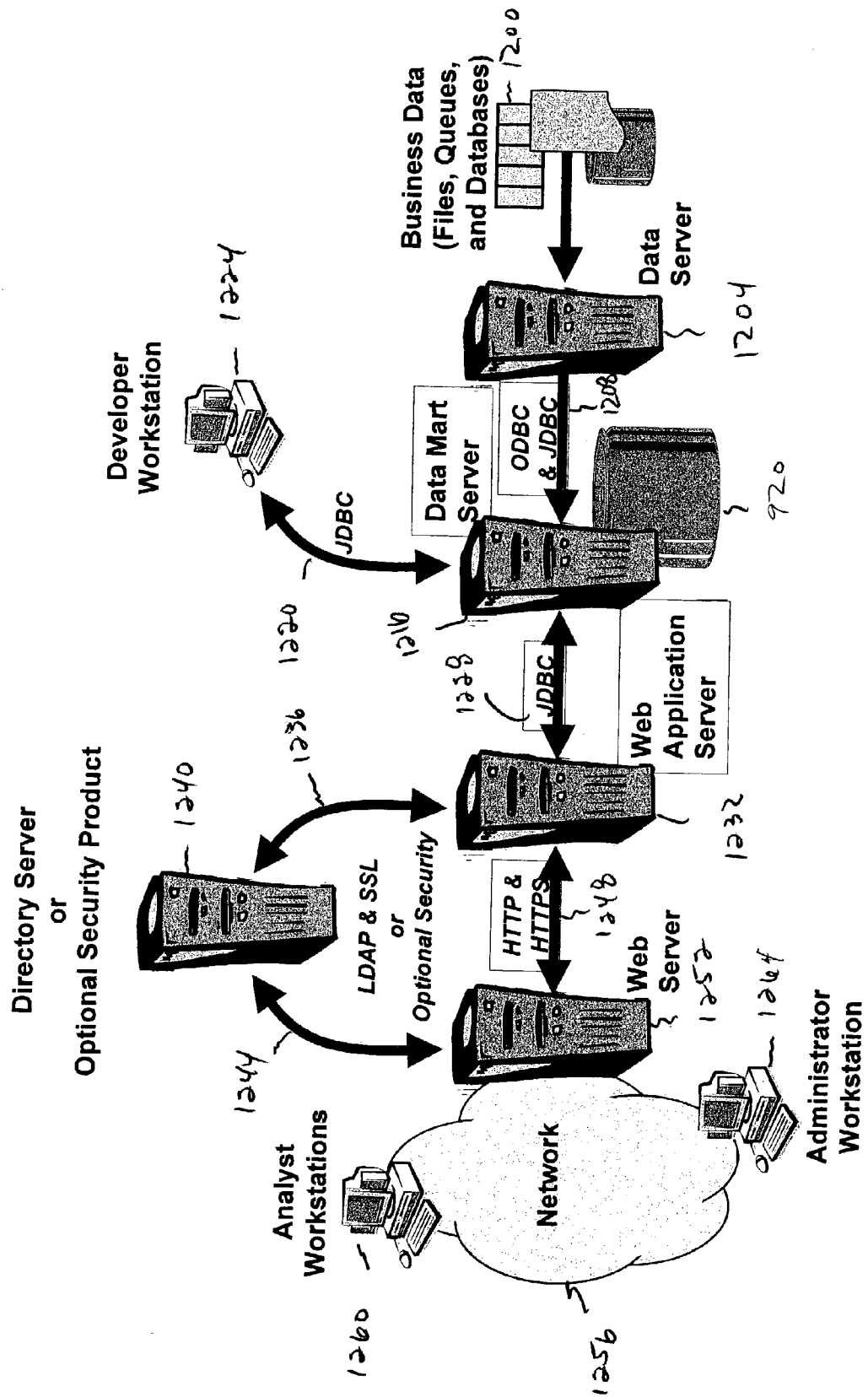
FIG. 12 represents a networked infrastructure suitable for implementation of the system.

FIG. 12 illustrates a configuration on which the invention can be practiced. Business data 1200 is the raw data 208 (pre-transformed) and can come from a variety of data sources and information systems, including, but not limited to files, queues and databases that are contained on a data server 1204. The raw data 208 is then transferred 1208 to a data mart server 1216 and data mart 920. A developer interface 1220 is provided to a developer workstation 1224 enabling interaction with the data mart server 1216. Information from the data mart server 1216 can be transferred 1228 to a web application server 1232 at which point an interface 1236 to a directory server/optional security product 1240 is available. Data between the web application server 1232 and web server 1252 is transferred through a link 1248. The web server 1252 has an interface 1244 to the directory server/optional security product 1240 and also connects to a network 1256. Analyst workstation 1260 and administrator workstation 1264 are connected to network 1256.

Workstations, network connections and databases for the implementation of the system are commercially available and integration of these platforms is known to those skilled in the art. As an example of units that can be used to assemble the system, the servers described in this figure can be based on operating systems such as Solaris™, AIX™, Linux™, Unix™, Windows NT™ or comparable platforms. Workstation and server equipment can be sourced from a variety of vendors, including, but not limited to Dell, Hewlett-Packard, IBM, and Sun. The network 1256 can consist of an intranet, Internet, LAN, WAN, or other infrastructure configurations that connect more than one workstation or server. The data mart 920 represents database structure including, but not limited to relational or hierarchal database which products are commercially available through vendors such as Oracle, IBM, and Sybase among others, whose products sell under the trade names Oracle 8, DB2, and Adaptive Server respectively. Protocols in transferring data, commands, or alerts between the workstations, servers, data sources, and network devices are based on industry standards and can be written in a variety of programming languages. FIG. 12 represents one particular system configuration encompassing multiple servers. Different configurations are also possible in deploying the advanced scenario-based alert generation and processing system 200. For example, it is possible to consolidate functions thereby reducing the number of servers needed.

Figure 11:
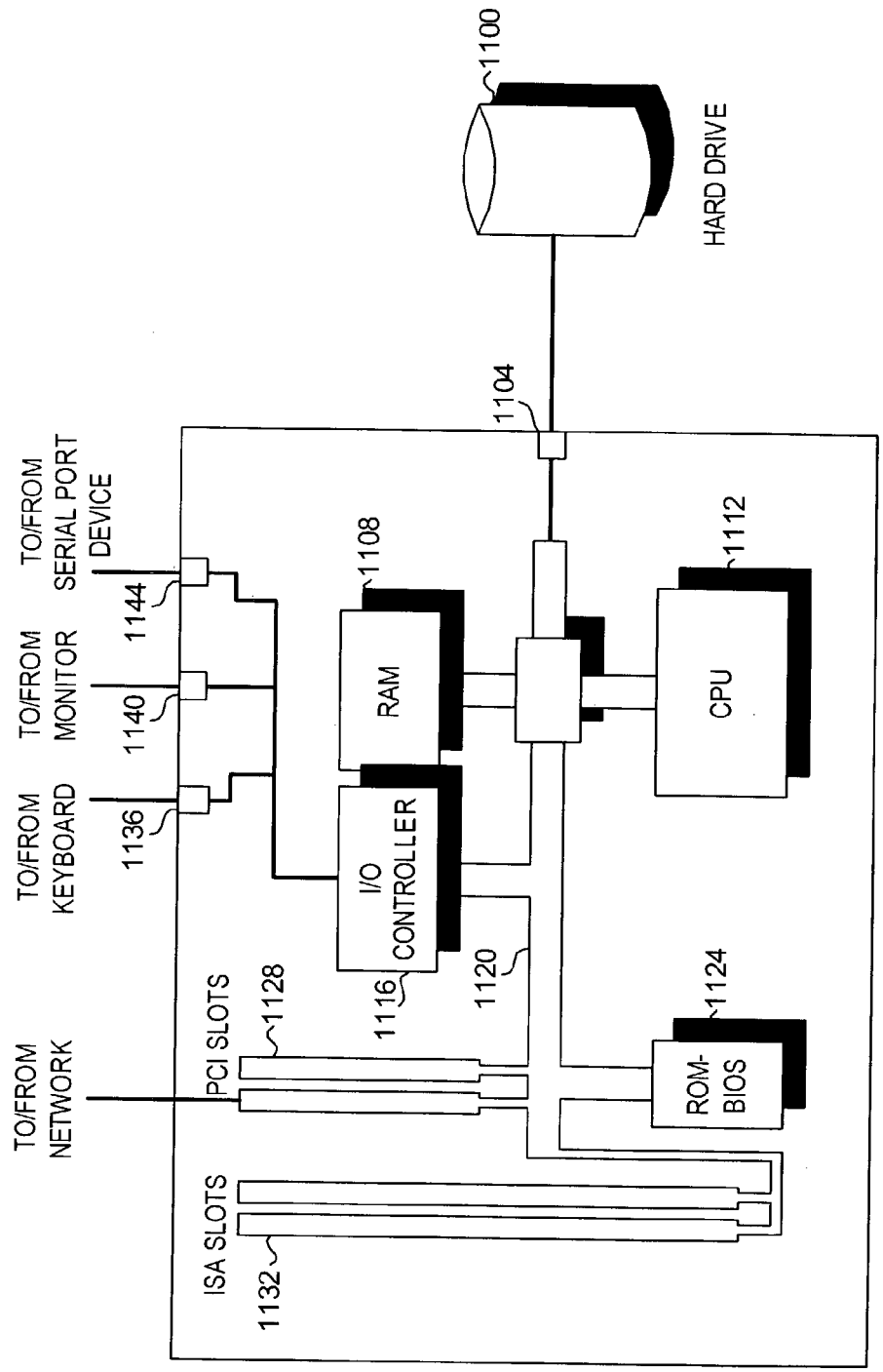
FIG. 11 represents a computer on which the system can be implemented.

FIG. 11 shows the block diagram of a computer system for a realization of the subscriber monitoring system based on the reception of multimedia signals from a bi-directional network. A system bus 1120 transports data among the CPU 1112, the RAM 1108, Read Only Memory—Basic Input Output System (ROM-BIOS) 1124 and other components. The CPU 1112 accesses a hard drive 1100 through a disk controller 1104. The standard input/output devices are connected to the system bus 1120 through the I/O controller 1116. A keyboard is attached to the I/O controller 1116 through a keyboard port 1136 and the monitor is connected through a monitor port 1140. The serial port device uses a serial port 1144 to communicate with the I/O controller 1116. Industry Standard Architecture (ISA) expansion slots 1132 and Peripheral Component Interconnect (PCI) expansion slots 1128 allow additional cards to be placed into the computer. In an embodiment, a network card is available to interface a local area, wide area, or other network.

The present invention can be realized in a number of programming languages including C, C++, Perl, HTML, Pascal, and Java, although the scope of the invention is not limited by the choice of a particular programming language or tool. Object oriented languages have several advantages in terms of construction of the software used to realize the present invention, although the present invention can be realized in procedural or other types of programming languages known to those skilled in the art.

FIG. 13 represents a user interface for a sequence scenario editor. Scenario editor descriptive elements 1300 contains information used to describe a particular scenario that is being considered. Certain sub-fields are fixed and are provided by the system, such as "Pattern" and "Scenario Use" whereas the remaining fields can be modified in providing additional information on the particular scenario. Scenario representation 1304 describes the associated scenario providing information on the process, steps, loops, or other elements be involved in a particular application. In the example shown in FIG. 13, scenario representation 1304 illustrates the advanced scenario of possible opposed trades in which a broker (the focus) may be soliciting both buy and sell orders on the same security, an unethical and therefore unacceptable (to the NASD) behavior. Scenario representation 1304 shows that an initial trade for a security is registered. Once that initial trade has been completed, opposing and/intermediate trades are reviewed to identify if those trades have been on the same security.

FIG. 14 represents a user interface for a threshold definer. Parameter elements 1400 provides a list of variables within the appropriate scenario. Furthermore, Parameter elements 1400 provides additional information, including, but not limited to "Name", "Display Name", "Description", "Units", and "Data Type" in more fully describing the variable, its attributes, and its use. Threshold parameters 1404 provides a user 128, developer 104, domain expert 108, or administrator 136 with the ability to modify or change threshold or parameter values associated with underlying variables. As an example, the thresholds and parameters that can be modified in threshold parameters include name, display name, default value, current value, max value, min value, data type, and units. Sub-field elements may also contain drop down menus to simplify use. By highlighting a row within parameter elements 1400, the associated information is then retrieved and displayed in the threshold parameters 1404 section.

Figure 15:
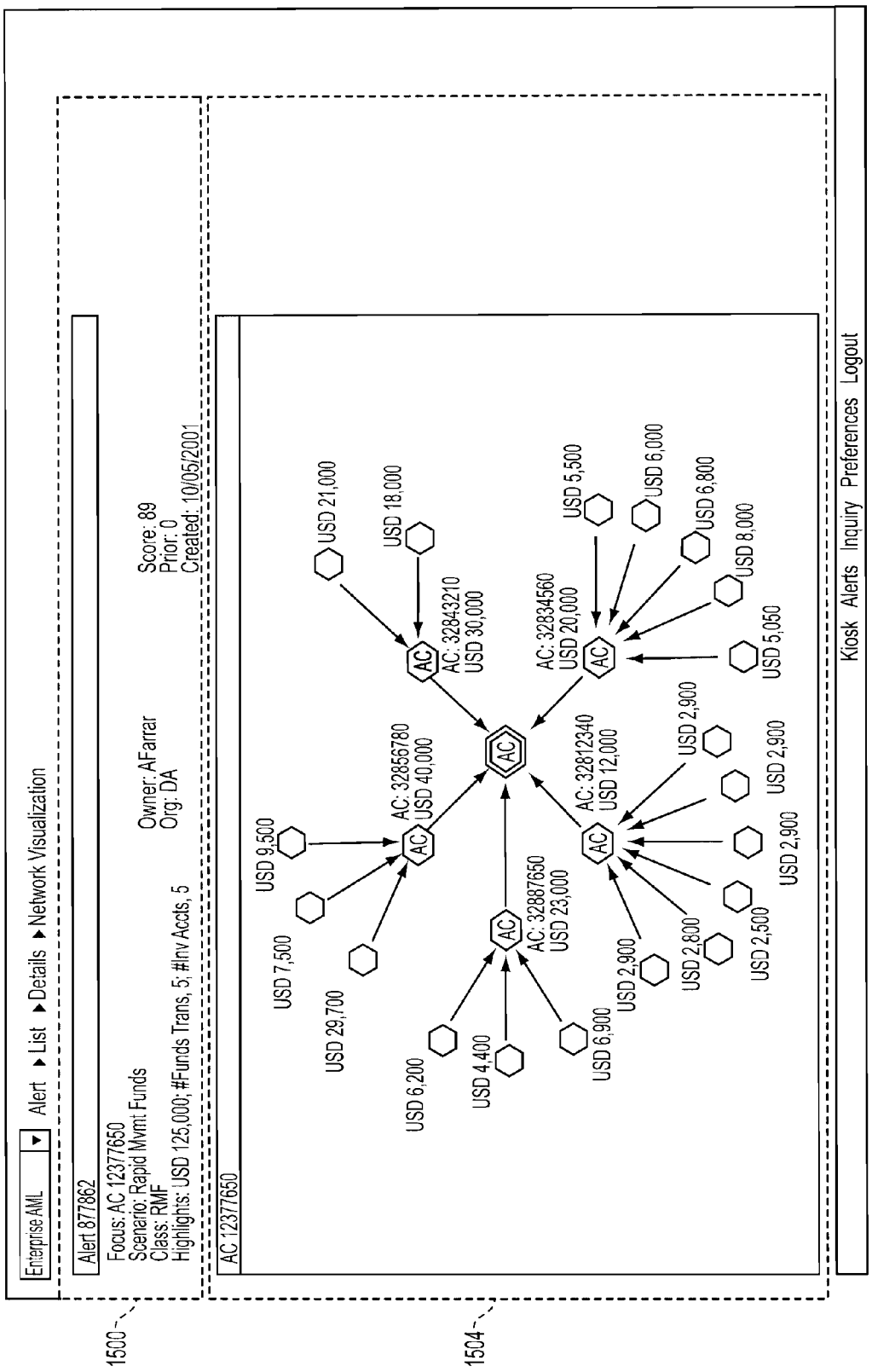
FIG. 15 illustrates a graphical user interface and display for network visualization of alerts.

FIG. 15 represents a user interface for a network alert visualization. Alert summary information 1500 provides summary information related to the alert including focus, scenario, class, highlights, owner, organization, prioritization, and the date the alert was created. Alert visualization 1504 is a graphically generated representation of the behavior, activity, or event of interest. In this particular screen capture, an example of networks of related accounts is provided. In the alert summary information 1500 section, a unique alert ID has been generated in order to track this event. Additional information has also been provided identifying the amount of money in question, along with the number of accounts and activities involved. As part of the case management process 416, an owner and organization have been assigned to this alert. The alert visualization 1504 section then provides a visualization of the transfers and amounts in question.

FIG. 16 represents a user interface for alert list. The filtering elements 1600 contains a plurality of sub-fields that can be used in modifying the presentation of alerts. For example, the sub-fields include organization or owner, scenario class or scenario, prioritization, focus, age, and status. Organization refers to a list of internally defined groups involved in the detection process. Owner refers to individuals or groups that have been assigned various alerts. A user 128, administrator 136, domain expert 108, or developer 104 may select the filtering elements 1600 sub-fields in affecting what information is displayed and in what order.

Referring to the user interface shown in FIG. 16, multiple alerts are shown in alert list 1604. Alert list 1604 contains a prioritization column 1640, where the prioritization SC represents a numeric value derived from the application of the scenarios and the parameterized values within the scenarios.

A focus column 1641 is present indicating the centralized event or entity of interest. A class column 1642 labeled CL indicates the general class of behavior (e.g. money laundering). The scenario column 1644 lists the scenario name. The highlights column 1646 provides the summary information of the individual events and entities. Prior column 1648 indicates the history of alerts on that focus (e.g. the number of prior alerts). Owner column 1650 indicates the user 128 who has been assigned the alert. Organization column 1652 indicates the organization in which the user 128 resides. Age 1652 indicates the number of days since the alert was created. Status column 1656 indicates the status of the alert, examples of which can be open, closed, pending, and transferred. Details column 1658 provides links, typically in the form of hyperlinks to alert details, such as those illustrated in FIG. 17.

In the user input section 1600, the user 128, administrator 136, domain expert 108, or developer 104 may select how the data is to be presented by sorting the output based on the prioritization, focus, class, scenario, prior alerts (prior), owner, organization (org), age, or status followed by the number of views retrieved at one time (e.g., 10, 20, 50, or 200 alerts). In one embodiment, these selections are made through the use of pull down entry fields and numerical entry fields. Within filtering elements section 1620, the user 128, administrator 136, domain expert 108, or developer 104 can filter based on organization, owner, scenario class, scenario, prioritization, focus, age and status. Within sort-by section 1624 the user 128, administrator 136, domain expert 108, or developer 104 can have the information displayed by ranking or grouping based on prioritization, focus, class, scenario, prior alerts (prior), owner, organization, age and status.

FIG. 17 represents a user interface for alert detail. Alert status 1700 section contains summary and status information relevant to the alert in question including focus, scenario, class, highlights, owner, organization, prioritization, priority, and date the alert was created. Focus refers to an event or entity of interest. Scenario refers to a specific type of detected behavior or activity of interest. Class is a general description of the type of scenario. Highlights provide summary information on the alert. Owner refers to an individual or group assigned to investigate the alert. Organization refers to a department overseeing this activity. Prioritization refers to a numeric value associated with the alert derived from the advanced behavior detection and alert generation system. Priority is a value associated with the importance and urgency of the alert, which is based on several factors. Created refers to the date the alert was generated. Alert details 1704 section provides specific detailed behavior, event, and activity-based information on the alert in question. Information on the customer bank, name, type, business unit, watchlist, and location are provided automatically by the system. The information contained in the remaining section is dependent upon the type of alert generated and will vary accordingly. The visual presentation of the detailed information expedites the users' ability to quickly and more accurately identify behaviors, activities, or events of interest that require further review or investigation or that enable the user to determine that the behaviors, events, or activities in question are legitimate.

FIG. 18 represents a user interface for alert history. Alert transaction 1800 section provides information on current alerts. Alert history 1804 provides history information on related elements of the alert transaction 1800. The history information can be linked through a plurality of fields or sub-fields. Previous alert transactions 1808 section provides information on past transactions that were completed based on earlier events. The alert history screen capture then allows current alert information to be reviewed in context with past alert history and transactions. While an investigation or review of a single event may not provide any meaningful insights or understandings, having historical and transactional data are extremely valuable then in creating a contextual overview of behavior, events, or actions.

FIG. 19 represents a user interface for workload management report screen capture. Workload management filters 1900 section may contain a plurality of fields or sub-fields wherein information or values may be altered in affecting the filtering of associated data. Such sub-fields could include organization or owner, scenario class or scenario, and age. Workload management report 1904 section provides information related to the report generation. Information included in this section contains report generation date and time along with a segmentation of selected alerts based on age of the alert. Workload management detail 1908 section provides specific alert information based on filtering elements provided in workload management filters 1900 section. In this section, information is presented based on the filtering elements contained in the workload management filters 1900 section. The presented information is grouped by organization and by owner. New alerts, open alerts, and reopened alerts columns provide numeric values both for the number of alerts affect and the age of the alerts. The workload management detail 1908 section also provides information on the average time of alert age by organization and for the total of each column, which facilities more efficient and effective workload process management.

FIG. 20 represents a user interface for alert disposition. Alert disposition filter 2000 section may contain a plurality of fields or sub-fields wherein information or values may be altered in affecting the filtering of associated data. Fields include organization or owner, alerts created during a specific period, scenario class or scenario, and prioritization. Alert disposition report 2004 section provides information related to the alert disposition report. Filtering information provided in alert disposition filter 2000 is confirmed in alert disposition report 2004 section along with summary information of the number of relevant alerts broken down into further classifications. The generated field provides a numeric value of the total number of alerts based on the filters. Below thresholds is a numeric value for alerts that do not meet certain threshold limits. This enables a user 128 to assess the threshold limit usefulness for potential modification. System autoclosed represents a numeric value of alerts the system automatically evaluated and closed without requiring further review or investigation based on applying intelligence and system rules. Pending system autoclose are alerts that are in the process of being closed through user review and investigation. Alert disposition detail 2008 section provides specific alert information based on filtering elements provided in alert disposition filter 2000 section. The alert information is group based on organization. Owners within the organization are further segmented with information provided based on their workload results. An additional category is also provided in the alert disposition detail 2008 section providing closing details. This category contains a plurality of columns in which alerts have been assigned. The numeric values in these columns and rows are related to the numeric values associated with individual owners. AWH refers to action withheld. IAE refers to invalid alert or system error. CO refers to case opened. DUP refers to duplicate. CTR refers to CTR filed. TTC refers to transfer. CS3 refers to close and suppress for 3 months. CS6 refers to close and suppress for 6 months. CSY refers to close and suppress for one year. SAR refers to suspicious activity report filed. Alert disposition definitions 2012 section contains definitions related to the alert disposition detail 2008 section.

The many features and advantages of the invention are apparent from the detailed specification. Thus, the appended claims are intended to cover all such features and advantages of the invention which fall within the true spirits and scope of the invention. Further, since numerous modifications and variations will readily occur to those skilled in the art, it is not desired to limit the invention to the exact construction and operation illustrated and described. Accordingly, all appropriate modifications and equivalents may be included within the scope of the invention.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

Representative Code

Link Analysis/Network Detection

Read input parameters: One or more datasets, list of internal node characteristics, description of external node characteristics, logic constraints.
  For each dataset:
  Read a row consisting of a From node, and To node, and a Link Type
  If one existing networks contain either the From node or To node, then add this row to that network.
  If one existing network contains the From node and a different existing network contains the To node, then merge those two networks and add this row to the merged network.
  If no existing networks contain either the From node or To node, then create a new network consisting solely of this row.
  Return to "Read a row" step until all rows are read from all datasets.
  Examine each network that has been constructed, if it does not meet the minimum size parameter; delete it.
  For each remaining node, if the node is of a prunable type and is only linked to one other node, discard it and all links associated with it.
  Examine each remaining network, if it does not meet the minimum size parameter; delete it and all links and nodes that are members.
  For each network: Capture Internal Characteristics (Number of nodes in the network, ID of the Primary Node in the network, Number of nodes to which the Primary Node is linked, Primary Node total measure (sum of the weight of the links associated with the Primary Node, both incoming and outgoing links), Primary Node incoming measure (sum of the weight of links with directionality into the Primary Node), Primary Node outgoing measure (sum of the weight of links with directionality away from the Primary Node), Number of links in the network, Average weight of the links in the network, Maximum weight of a link in the network, Earliest timestamp of a link in the network, Latest timestamp of a link in the network, Number of links with directionality into the Primary Node, Number of links with directionality away from the Primary Node, Number of links associated with the Primary Node with no directionality, Business ID of the Primary Node.
  For each network: Capture External Characteristics. These are characteristics of the network that can only be measured by accessing external data sources in conjunction with the network nodes.
  Compare each network against Logic Constraints.
  Create a match for each network that matches the Logic Constraints.
  Output all Matches.

Sequence Detection

Read input parameters: One or more Datasets, Sequence pattern. Sequence pattern consists of:
  A Top Level Sequence Node. The Top Level Sequence Node contains a "Longest/Shortest" flag that tells whether the longest or shortest match found should be saved. The Top Level Sequence Node can contain a "Distance Range" that specifies the time range within which the matched rows must fall.
  Sequence Nodes have one or more child nodes. The node types of these children can be: another Sequence Node, an Or Node, a Row Node.
  Sequence Nodes can contain a "Looping Range" that specifies how many times the Sequence may match.
  Or Nodes can have one or more child nodes. The node types of these children can be: another Sequence Node, an Or Node, a Row Node.
  Row nodes contain the following parameters:
    A dataset to be matched ("Dataset")
    A "Looping Range"
    A Boolean logic constraint ("Logic Constraint")
    A set of variable to bind ("Variables") and expressions for calculating the Variable's value ("Expressions")
    A Record/No-record Flag
Initialize datasets
  Read each Dataset. Each Dataset has a list of fields that should be used to sort the dataset.
  Sort each dataset individually.
Find matches:
  Select the next row to be matched. If there are multiple datasets, this is done by examining the next row in each individual dataset and picking the one with the lowest value of shared ordering attributes.
  Create a Partial Match State positioned at the Top Level Sequence Node.
  For each Partial Match State
    If it is positioned at a Sequence Node, create a new Partial Match State positioned at the first child node. The new Partial Match State is added to the list of States yet to be evaluated.
    If it is positioned at an Or Node, create a new Partial Match State for each child node. Position each at the corresponding child node. The new Partial Match States are added to the list of States yet to be evaluated.
    If it is positioned at a Row Node, do the following:
      Check if the dataset row comes from the same dataset as the Dataset specified in this Row Node.
      If so, proceed to next step. Otherwise continue with the next Partial Match State.
      Compare the Logic Constraint to the Dataset rows contents.
      If Logic Constraint evaluates to true, proceed to next step. Otherwise continue with the next Partial Match State.
      Bind all Variables to value resulting from evaluating corresponding Expression.

If Record/No-record flag is set to Record, store matched row to be output with alert.

Create new Partial Match States that point to nodes following this Row Node. If this Row Node is a child of a Sequence Node, then a new state is added positioned at the next child. If this Row Node has a Looping Range that has not reached its maximum value, then also create a new state positioned at this Row Node. If this Row Node is a child of an Or Node or the last child of a Sequence Node then also create a new state positioned after the parent node. If this Row Node the last child of a Sequence Node that has a Looping Range that has not reached its maximum value, then also create a new state positioned at the parent Sequence Node. These new Partial Match States are saved until the next dataset row is read.

If it is positioned after the last child of the Top Level Sequence Node, then create a Match consisting of matched rows and bound Variables if the time between the first matched event and the last matched event within the Top Level Sequence Node's Distance Range. If a previous Match exists that started with the same dataset row, then:

If the Top Level Sequence Node Longest/Shortest flag is set to Longest, throw out previous match and keep this match.

If the Top Level Sequence Node Longest/Shortest flag is set to Shortest, throw out this match and keep previous match.

Return to initial step, "Select the next row to be matched" unless there are no more rows to examine in any datasets.

Output all matches.

Outlier Detection

Read input parameters: Dataset and Outlier Detection Pattern. Outlier Detection Pattern consists of:

Multiple sets of one or more Dimensions ("Dimension Set"). Each Dimension is mapped to a field in the dataset.

A Target Point. This is a value for each Dimension in each Dimension Set.

A Neighborhood Size.

A Minimum Dimension Set Count.

Find matches:

For each Dimension Set

For each row in the dataset, calculate the distance between that row and the target point (both as projected onto the Dimension Set).

Find the K rows closest to the target point where K=Neighborhood Size. These K rows compose this Dimension Set's Neighbors.

For each row in the dataset, count the number of Dimension Sets that include that row as a Neighbor.

If that count is >=the Minimum Dimension Set Count, create a match for that row consisting of the row.

Output all matches.

Rules-based Detection

Read input parameters: Primary Dataset, zero or more Secondary Datasets, Rule pattern. Rule pattern consists of (for each dataset):

Set of Boolean logic constraints ("Logic Constraints")

A number range constraining the number of rows matched ("Rows Matched Range")

A set of variable to bind ("Variables") and expressions for calculating the Variable's value ("Expressions")

A Record/No-record Flag

A field in dataset that maps to Scenario Focus ("Focus Field")

Find matches:

Read row from Primary Dataset.

Compare Primary Dataset's Logic Constraints to row contents.

If Primary Dataset's Logic Constraints evaluate to true, then proceed to next step. Otherwise go back to "Read row from Primary Dataset" step.

Bind all Variables to value resulting from evaluating corresponding Expression.

If Record/No-record flag is set to Record, store matched row to be output with alert.

Bind Focus to value in Focus Field For each Secondary Dataset:

Read rows from Secondary Dataset with Focus Field value matching Focus.

For each row, compare Secondary Dataset's Logic Constraint to row contents.

Count number of rows that match Logic Constraint.

If count is within Rows Matched Range, then proceed to next step. Otherwise, go back to "Read row from Primary Dataset" step.

Bind all Variables to value resulting from evaluating corresponding Expression.

If Record/No-record flag is set to Record, store matched rows to be output with alert.

Create alert. If constraint is met for Primary Dataset and Rows Matched Range is satisfied for all Secondary Datasets, then create alert consisting of Focus, recorded rows and variables.

Return to "Read row from Primary Dataset" step.

Output All Alerts

Prioritization

Read input parameters: Set of Matches, Match Prioritization Strategy Logic

For each Match in Set of Matches:

Set Match Score (MS)=0

If Scenario Lookup Strategy is included in Match Prioritization Strategy Logic, then look up Score (S) associated with this Match's Scenario. MS=MS+S.

If Simple Lookup Strategy is included in Match Prioritization Strategy Logic, then compare the value of the specified Match Binding with the associated value in the Simple Lookup Strategy. If the two are equal, then look up the Score (S) associated with the Simple Lookup Strategy. MS=MS+S.

If Graduated Lookup Strategy is included in the Match Prioritization Strategy Logic, then:

Look up the Scoring Input Value (SIV) of the specified Match Binding.

Read parameters from the Graduated Lookup Strategy: Lower Value (LV), Minimum Value (MIV), Upper Value (UV), Max Value (MAV)

Compute the rise of the point value (M) between the lower and upper bounds. M=(MAV−MIV)/(UV−LV)

MS=MS+(M * (SIV−LV)+MIV)

If Graduated Count Strategy is included in Match Prioritization Strategy Logic:

Read parameters from the Graduated Count Strategy: Time Window (TIM), Lower Value (LV), Minimum Value (MIV), Upper Value (UV), Max Value (MAV), Same Scenario (SS)

Find the count (CO) of prior matches within TIM that have the same Focus as this Match. If SS is "Yes" then only include matches that are the same scenario as this Match.

Compute the rise of the point value (M) between the lower and upper bounds.

M=(MAV−MIV)/(UV−LV)

MS=MS+(M * (CO−LV)+MIV)

Output Set of Prioritized Matches (matches can be prioritized by Match Score)

Grouping

Read input parameters: Set of Prioritized Matches, Match Grouping Strategy

If the Match Grouping Strategy is "Bind Match" then group Matches together that have the same Focus and have the same Match Binding values for a set of Match Bindings specified in the Match Grouping Strategy.

If the Match Grouping Strategy is "Bind Behavior Scenario" then group Matches together that have the same Focus, the same Scenario, and the same Match Binding values for a set of Match Bindings specified in the Match Grouping Strategy.

If the Match Grouping Strategy is "Single Alert Match" then each Match is its own group.

Output groups of Matches. Groups of 1 are also groups.

Alert Prioritization

Read input parameters: Set of Match Groups, Alert Prioritization Strategy Logic

Each Match Group is an Alert. Set of Match Groups is Set of Alerts.

For each Alert in Set of Alerts:

If Max Match Score is specified in Alert Prioritization Strategy Logic, then Alert Score is set to maximum of scores of matches in this Alert.

Else if Avg Match Score is specified in Alert Prioritization Strategy Logic, then Alert Score is set to average of scores of matches in this Alert.

Output Set of Prioritized Alerts (Alerts can be prioritized by Alert Score)

What is claimed is:

1. A computer-based method for generating alerts to a behavior as represented in data, the method comprising:
   receiving financial data from at least one source, wherein the received financial data comprises data representative of a plurality of transactions and a plurality of entities, wherein the plurality of transactions and the plurality of entities are not predetermined to be related;
   identifying a behavior of interest that comprises one or more sequence detection requirements;
   determining, by a computing device, whether one or more groups of the transactions and the entities collectively satisfy at least one of the sequence detection requirements;
   if so, assigning a corresponding priority to each group by, for each group:
      determining a match score value associated with the group, and
      determining the priority for the group by one or more of the following:
         summing the match score and a first value associated with the behavior of interest,
         summing the match score and a second value, wherein the second value is based on a graduated scale, and
         summing the match score and a third value, wherein the third value is based on one or more prior occurrences of the behavior of interest within a period of time; and
   generating an alert comprising one or more of the groups and the corresponding priority.

2. The method of claim 1, wherein determining whether one or more groups of the transactions and the entities collectively satisfy at least one of the sequence detection requirements comprises performing:
   link analysis to establish relationships between the plurality of events and the plurality of entities.

3. The method of claim 2, wherein determining whether one or more relationships exist further comprises using rules-based detection to determine whether constraints are met.

4. The method of claim 2, wherein determining whether one or more groups of the transactions and the entities collectively satisfy at least one of the sequence detection requirements further comprises:
   determining a focus;
   identifying one or more highlights of the events and entities that correspond to a plurality of relationships; and
   identifying one or more parameters that may be varied by a user to set a relationship match and confirm whether the specified behavior of interest is present from the identified relationships.

5. The method of claim 1, wherein generating an alert comprises:
   sending a user a data summary; and
   providing the user with one or more dynamic links to information associated with the alert.

6. The method of claim 5, further comprising:
   identifying one or more past alerts associated with one or more of the identified events and the identified entities, wherein the past alerts are created prior to the generated alert; and
   providing the one or more past alerts to a user.

7. The method of claim 1, wherein generating an alert comprises:
   sending a user a data summary;
   receiving, from the user, a request for alert details associated with the data summary; and
   sending the alert details to the user.

8. The method of claim 1, wherein generating an alert comprises:
   receiving, from a user, a request to change a status associated with the alert from a first status to a second status, wherein the request comprises supporting information; and
   changing the status of the alert from the first status to the second status.

9. The method of claim 1, wherein generating an alert comprises:
   providing history information associated with one or more of the identified events and the identified entities to a user; and
   providing one or more past alert transactions associated with one or more of the identified events and the identified entities to the user.

10. The method of claim 1, wherein generating an alert comprises:
    providing one or more alert visualizations associated with identified events and the identified entities to a user.

11. The method of claim 1, further comprising:
    assigning a score to each group;
    determining an alert value associated with the alert based on the assigned score; and if the alert value is below a threshold value, automatically closing the alert.

12. A computer-based method of generating alerts to a behavior as represented in data, the method comprising:
receiving financial data from at least one source, wherein the received financial data comprises data representative of a plurality of transactions and a plurality of entities, wherein the plurality of transactions and the plurality of entities are not predetermined to be related;
accessing a scenario library to identify a detection algorithm for identifying a behavior of interest;
identifying a group of potentially significant transactions by analyzing each transaction in the received data;
applying the detection algorithm to determine whether the potentially significant transactions in the group collectively exhibit a time-based pattern that is indicative of the behavior of interest;
if so, assigning a priority to the group by:
determining a match score value associated with the group, and
determining the priority for the group by one or more of the following:
summing the match score and a first value associated with the behavior of interest,
summing the match score and a second value, wherein the second value is based on a graduated scale, and
summing the match score and a third value, wherein the third value is based on one or more prior occurrences of the behavior of interest within a period of time; and
generating an alert comprising:
the potentially significant transactions in the group,
the entities engaged in the potentially significant transactions,
the priority,
a focus,
one or more highlights of the events and entities that correspond to each identified relationship, and
one or more parameters that may be varied by a user to set a relationship match and confirm whether the specified behavior of interest is present from identified relationships.

13. The method of claim 12, wherein applying the detection algorithm to determine whether the potentially significant transactions in the group collectively exhibit a time-based pattern comprises:
performing sequence matching to identify one or more sequences in the plurality of events; and
relating the identified sequences to the plurality of entities.

14. The method of claim 13, wherein the analyzing also comprises using rules-based detection to determine whether constraints are met.

15. The method of claim 12, wherein applying the detection algorithm to determine whether the potentially significant transactions in the group collectively exhibit a time-based pattern comprises:
automatically analyzing a first plurality of events by a first entity to determine whether a change in behavior occurred; and
if a change in behavior occurred, automatically analyzing a second plurality of events by a second entity to determine whether the change of behavior occurred.

16. The method of claim 12, wherein assigning a priority to the group further comprises prioritizing the groups based on one or more of the following adjustable parameters:
an amount;
a number of events;
a type of event;
a geographic location associated with an entity;
a geographic location associated with an event;
one or more parties involved in an event;
a product line; and
a line of business.

17. The method of claim 12, wherein applying the detection algorithm to determine whether the potentially significant transactions in the group collectively exhibit a time-based pattern comprises:
applying link analysis to establish one or more pairs of linked events;
linking at least a portion of the pairs into a web of interrelated events; and
applying sequence matching to the interrelated events to determine whether the events occurred in a sequence corresponding to a behavior of interest.

18. The method of claim 12, further comprising:
routing the alert to one or more recipients based on the assigned priority.

19. A system for generating alerts to a behavior as represented in data, the system comprising:
a processor; and
a processor readable storage medium in communication with the processor,
wherein the processor readable storage medium contains one or more programming instructions for:
receiving financial data from at least one source, wherein the received financial data comprises a plurality of transactions and a plurality of entities, wherein the plurality of transactions and the plurality of entities are not predetermined to be related;
identifying a descriptive element that comprises one or more sequence detection requirements;
determining, whether one or more groups of the transactions and the entities collectively satisfy at least one of the sequence detection requirements;
if so, assigning a corresponding priority to each group by, for each group:
determining a match score value associated with the group, and
determining the priority for the group by one or more of the following:
summing the match score and a first value associated with the behavior of interest,
summing the match score and a second value, wherein the second value is based on a graduated scale, and
summing the match score and a third value, wherein the third value is based on one or more prior occurrences of the behavior of interest within a period of time; and
generating an alert comprising one or more of the groups and the corresponding priority.

20. The system of claim 19, wherein the one or more programming instructions for determining whether one or more groups of the transactions and the entities collectively satisfy at least one of the sequence detection requirements further comprise one or more programming instructions for:
determining a focus;
identifying one or more highlights of the events and entities that correspond to a plurality of relationships; and
identifying one or more parameters that may be varied by a user to set a relationship match and confirm whether the specified behavior of interest is present from the identified relationships.

21. The system of claim 19, wherein the one or more programming instructions for generating an alert comprise one or more programming instructions for:
 sending a user a data summary; and
 providing the user with one or more dynamic links to information associated with the alert.

22. The system of claim 19, wherein the one or more programming instructions further comprise one or more programming instructions for:
 identifying one or more past alerts associated with one or more of the identified events and the identified entities, wherein the past alerts are created prior to the generated alert; and
 providing the one or more past alerts to a user.

23. The system of claim 19, wherein the one or more programming instructions further comprise one or more programming instructions for:
 assigning a score to each group;
 determining an alert value associated with the alert based on the assigned score; and
 if the alert value is below a threshold value, automatically closing the alert.

24. A computer-based method for generating alerts to a behavior as represented in data, the method comprising:
 receiving a first set of financial data from a first source, wherein the first set of financial data comprises a first plurality of transactions and a first plurality of entities, wherein the first plurality of transactions and the first plurality of entities are not predetermined to be related;
 accessing a scenario library to identify a detection algorithm for identifying a behavior of interest;
 applying the detection algorithm to identify a second plurality of transactions and a second plurality of entities in the first set of financial data that are collectively indicative of the behavior of interest;
 determining whether one or more relationships exist among the identified second plurality of transactions and the identified second plurality of entities from the first set of financial data;
 if so, generating a first alert having a first priority, wherein the first priority is determined by:
  determining a first match score value, and
  determining a sum of one or more of the following:
   the first match score and a first value associated with the behavior of interest,
   the first match score and a second value, wherein the second value is based on a graduated scale, and
   the first match score and a third value, wherein the third value is based on one or more prior occurrences of the behavior of interest within a period of time;
 receiving a second set of financial data from a second source, wherein the second set of financial data comprises a third plurality of transactions and a third plurality of entities, wherein the third plurality of transactions and the third plurality of entities are not predetermined to be related;
 combining the first set of financial data and the second set of financial data to produce an updated set of financial data;
 applying the detection algorithm to identify a fourth plurality of transactions and a fourth plurality of entities in the updated set of financial data that are collectively indicative of the behavior of interest;
 determining whether one or more relationships exist among the fourth plurality of transactions and the fourth plurality of entities from the updated set of financial data;
 if so, generating a second alert having a second priority;
 prioritizing the first alert and the second alert based on the first priority and the second priority; and
 providing a user an alert summary comprising one or more of the first alert and the second alert.

* * * * *